US010794429B2

(12) United States Patent
Huber et al.

(10) Patent No.: US 10,794,429 B2
(45) Date of Patent: Oct. 6, 2020

(54) COUPLING DEVICE AND FIBRE-REINFORCED ARTICULATION DEVICE

(71) Applicants: SUEDDEUTSCHE GELENKSCHEIBENFABRIK GMBH & CO., KG, Waidkraiburg (DE); SIEMENS AKTIENGESELLSCHAFT, Munich (DE)

(72) Inventors: Armin Huber, Schoenberg (DE); Wolfgang Orthofer, Muehldorf a. Inn (DE); Josef Eberler, Neumarkt (DE); Klaus Joos, Nuremberg (DE); Martin Ebenhofer, Reut (DE); Marc Brandl, Burgkirchen (DE)

(73) Assignees: SIEMENS MOBILITY GMBH, Munich (DE); Süddeutsche Gelenkscheibenfabrik GmbH & Co. KG, Waldkraiburg (DE)

(*) Notice: Subject to any disclaimer, the term of this patent is extended or adjusted under 35 U.S.C. 154(b) by 309 days.

(21) Appl. No.: 15/536,961

(22) PCT Filed: Dec. 17, 2015

(86) PCT No.: PCT/EP2015/080320
§ 371 (c)(1),
(2) Date: Jun. 16, 2017

(87) PCT Pub. No.: WO2016/097195
PCT Pub. Date: Jun. 23, 2016

(65) Prior Publication Data
US 2018/0180104 A1 Jun. 28, 2018

(30) Foreign Application Priority Data
Dec. 17, 2014 (DE) .................. 10 2014 018 842

(51) Int. Cl.
F16D 3/78 (2006.01)
F16D 1/076 (2006.01)

(52) U.S. Cl.
CPC .............. F16D 3/78 (2013.01); F16D 1/076 (2013.01)

(58) Field of Classification Search
CPC .............. F16D 3/78; F16D 1/076; F16D 3/62
(Continued)

(56) References Cited

U.S. PATENT DOCUMENTS 1,682,721 A * 8/1928 Bijur ................. F16D 3/78
464/95
3,500,659 A * 3/1970 Martin ............... F16D 3/78
464/93

(Continued)

FOREIGN PATENT DOCUMENTS

DE 19639304 A1 3/1998
DE 29808627 U1 7/1998
(Continued)

OTHER PUBLICATIONS

International Search Report for International Patent Application No. PCT/EP2015/080320 dated Mar. 11, 2016 (English language translation attached).

Primary Examiner — Greg Binda
(74) Attorney, Agent, or Firm — Moore & Van Allen PLLC; Henry B. Ward, III

(57) ABSTRACT

A coupling device is provided for connecting a motor to a transmission of a vehicle, particularly of a railway vehicle, with at least one first flange, at least one second flange, at least one first thread-reinforced joint mechanism, at least one second thread-reinforced joint mechanism, and at least one connection assembly that is arranged between the first and the second thread-reinforced joint mechanism. The at least one first thread-reinforced joint mechanism and the at least (Continued)

one second thread-reinforced joint mechanism define a connection area between them in the direction of the center axis of the coupling device, with it being possible to connect the first thread-reinforced joint mechanism starting from this connection area to the at least one connection assembly and the first flange, and to connect the second thread-reinforced joint mechanism to the at least one connection assembly and the at least one second flange.

38 Claims, 31 Drawing Sheets

(58) Field of Classification Search
USPC .................................................. 464/69, 93–95
See application file for complete search history.

(56) References Cited

U.S. PATENT DOCUMENTS

| | | | | |
|---|---|---|---|---|
| 4,182,434 A | * | 1/1980 | Munz | F04D 29/669 |
| | | | | 464/94 |
| 5,540,621 A | * | 7/1996 | Keester | B29C 53/564 |
| | | | | 464/93 |
| 10,400,828 B2 | * | 9/2019 | Huber | B61C 9/44 |

FOREIGN PATENT DOCUMENTS

| | | | |
|---|---|---|---|
| DE | 102012002660 A1 | | 8/2013 |
| DE | 102012002757 A1 | | 8/2013 |
| EP | 0035283 A1 | | 9/1981 |
| EP | 2626579 A2 | | 8/2013 |
| GB | 546351 | * | 7/1942 ..................... 464/94 |

* cited by examiner

COUPLING DEVICE AND FIBRE-REINFORCED ARTICULATION DEVICE

FIELD

The present invention relates to a coupling device for connecting a motor to a transmission of a vehicle. Furthermore, the present invention relates to a thread-reinforced joint mechanism for such a coupling device.

BACKGROUND

Such coupling devices are arranged on the input side in a vehicle, particularly in a railway vehicle. In this context, what is to be understood by an input-side arrangement of the coupling device is that the coupling device is arranged between a motor output shaft and a transmission input shaft, i.e., it connects the motor to the transmission.

In the field of railway vehicles, curved-tooth couplings are usually used to connect a motor to a transmission. Such curved-tooth couplings are known from the prior art and described in DE 298 08 627 U1, for example. Due to their construction and the oiling and greasing required, curved-tooth couplings are very maintenance-intensive. The assembly and disassembly of a curved-tooth coupling is associated with a very considerable expenditure of time. Due to the teeth, curved-tooth couplings also have a strong tendency to develop noises. Given their construction, the installation of curved-tooth couplings is very laborious and therefore cost-intensive.

The reason for this is that, when installing a curved-tooth coupling in a drivetrain of a railway vehicle, the transmission of the railway vehicle drive must always be additionally swung out in order to be able to install the curved-tooth coupling. Once the transmission has been swung out, each of the two halves of the curved-tooth coupling must first be connected to the motor or the transmission. The transmission is then swung in with its half of the coupling. It is only in this state that the two halves of the curved-tooth coupling are connected to one another.

Another coupling device known from the prior art is disclosed in DE 196 39 304 A1. This document describes an elastic articulated coupling with an intermediate ring arranged between two coupling flanges. The intermediate ring has individual metal elements distributed on the periphery that are vulcanized into rubber blocks and screwed alternately to the coupling flanges. The metal elements of the intermediate ring consist of wedges distributed uniformly in the circumferential direction. The wedges extend in the radial direction over the entire width of the ring. Rubber blocks vulcanized in between the wedges are under compressive stress in the circumferential direction when installed.

Moreover, double-torsion couplings of the type disclosed in DE 10 2012 002 660 A1 are known from the prior art.

This double-torsion coupling has a first torsion coupling and a second torsion coupling. The first torsion coupling comprises a first connecting flange for connecting to a torque-generating power shaft and a plurality of lugs, each of which is connected to the first connecting flange in an end region. The second torsion coupling comprises a connecting flange, which is used to connect to a driven shaft. The two torsion couplings are interconnected by an intermediate member to which the respective other end regions of the lugs are connected. The lugs are connected or screwed to the intermediate member starting from the first connecting flange or the second connecting flange, so that the lugs must be accessible on both sides in order to enable them to be connected to the first flange or the second flange as well as to the intermediate member.

BRIEF SUMMARY OF THE INVENTION

It is an object of the present invention to provide a coupling device that is to be installed quickly and easily in a limited installation space It is another object of the present invention to provide a coupling device that is particularly suitable for use on the input side in a railway vehicle.

These objects are achieved by a coupling device with the features described herein.

Additional embodiments of the invention are indicated in the dependent claims.

The coupling device according to the invention for connecting a motor to a transmission of a vehicle, particularly of a railway vehicle, comprises at least one first flange, at least one second flange, at least one thread-reinforced joint mechanism, and at least one second thread-reinforced joint mechanism. At least one connection assembly is arranged between the first and second thread-reinforced joint mechanisms. The at least one first thread-reinforced joint mechanism and the at least one second thread-reinforced joint mechanism define a connection area between in the direction of the center axis of the coupling device. Starting from this connection area, the first thread-reinforced joint mechanism can be connected to the at least one connection assembly and the first flange, and the second thread-reinforced joint mechanism can be connected to the at least one connection assembly and the second flange.

The coupling device according to the invention thus enables all of the components to be interconnected or attached to one another starting from the connection area. The coupling device according to the invention enables assembly or disassembly even if the flanges for connecting to the thread-reinforced joint mechanisms are not accessible or only poorly accessible. Accordingly, in order to assemble or disassemble the coupling device according to the invention, the first thread-reinforced joint mechanism and the second thread-reinforced joint mechanism only need to be accessible from an axial side, that is, from the connection area.

The coupling device according to the invention also makes it possible for all of its components to be inserted and installed and to be removed in the radial direction via the connection area. In other words, the first thread-reinforced joint mechanism, the second thread-reinforced joint mechanism, and also the at least one connection assembly can be inserted and removed in the radial direction via the connection area. The at least one connection assembly can be removed in the radial direction even if the first thread-reinforced joint mechanism and the second thread-reinforced joint mechanism are accessible for assembly or disassembly only from one of their axial surfaces. Starting from the connection area, the first thread-reinforced joint mechanism can be connected to the first flange and the second thread-reinforced joint mechanism to the second flange. Subsequent to that, the joint mechanisms can be connected to the at least one connection assembly inserted in the radial direction.

Since both the first and the second thread-reinforced joint mechanism, as well as the at least one connection assembly, can be inserted and removed radially, i.e., transverse to the longitudinal axis, and the thread-reinforced joint mechanisms can be connected starting from the connection area to the respective flange associated with them, very little space is required for the assembly and disassembly of the coupling device according to the invention. Since the components of the coupling device according to the invention can be inserted in the radial direction and positioned and attached starting from the connection area, i.e., from only one axial side, very little space in the axial direction is required for the introduction of the thread-reinforced joint mechanisms and the at least one connection assembly. Precisely in the case of railway vehicles, access is limited to the area between transmission and motor, so the ability to introduce the thread-reinforced joint mechanisms and the at least one connection assembly radially and to connect the individual components of the coupling device according to the invention starting from the connection area extending in the axial direction constitutes a substantial advantage over the prior art.

The coupling device according to the invention is particularly suitable for use on the input side in a railway vehicle; that is, the coupling device can be used to connect a motor to a transmission of a railway vehicle. Accordingly, the at least one first flange and the at least one second flange can be designed for connecting to a motor output shaft and a transmission input shaft of a railway vehicle. Such coupling devices are used particularly in partially sprung drivetrains of railway vehicles. The motor can be mounted on a bogie of the railway vehicle, whereas the transmission is mounted on the wheel set, for example as a straddle-type transmission. The coupling device according to the invention connects the motor shaft and the transmission shaft and offsets relative movements of the electric motor in relation to the transmission.

The thread-reinforced joint mechanisms also serve to reduce the unsprung masses on the wheel and wheel set of the vehicle. For this purpose, the motor is elastically arranged or supported on a vehicle frame or, in the case of railway vehicles, on a bogie. As a result of the elastic supporting of the motor, relative movements between the motor and the wheel/wheel set or relative movements between the motor and the transmission can occur. These relative movements between the elastically supported motor and the wheel and wheel set must be offset. The at least one thread-reinforced joint mechanism is used to offset this relative movement.

With the coupling device according to the invention, all of the drawbacks of a curved-tooth coupling described at the outset can be eliminated; that is, the coupling device according to the invention is less maintenance-intensive, easier to install, and makes less noise that the known curved-tooth couplings. Furthermore, no oiling or greasing is required with the coupling device according to the invention. Another advantage of the coupling device according to the invention in comparison to curved-tooth couplings is that the coupling device according to the invention is more torsionally resilient. In contrast, the curved-tooth couplings known from the prior art are very rotationally rigid. In the event of a motor short circuit, a very strong torque builds up due to the mass inertia of a vehicle wheel or wheel set that can damage the transmission. With the coupling device according to the invention with the thread-reinforced joint mechanisms, the drivetrain can twist due to the torsional resilience of the coupling device and the thread-reinforced joint mechanisms. As a result, only a small amount of torque builds up even in the event of a motor short circuit that cannot damage the transmission.

Compared to the curved-tooth couplings known from the prior art, the transmission does not have to be additionally swung out during the installation of the coupling device according to the invention; rather, the coupling device according to the invention can be installed directly between the motor and the swung-in transmission. As mentioned previously, the coupling device according to the invention enables the radial insertion, i.e., the insertion transverse to the longitudinal axis, of all of its components, which can then be connected and attached starting from the connection area. Even the at least one connection assembly can be inserted radially and then connected to the thread-reinforced joint mechanisms. As a result, even the limited space between the motor and the swung-in transmission is sufficient for the assembly of the coupling device according to the invention. The process for the installation of the coupling device according to the invention can thus be reduced substantially compared to that required for curved-tooth couplings.

The coupling device according to the invention is designed so as to be electrically insulating, so that no electric current can flow or be conducted via the coupling device. As a result, unlike the prior art, an electrically insulating roller bearing on the motor can be omitted.

Since the first and second joint mechanisms of the coupling device according to the invention are thread-reinforced, the coupling devices according to the invention have greater power density than the rubber elements known from the prior art. The thread-reinforcement of the joint mechanisms results in increased tensile strength, so substantially less installation space is required for the thread-reinforced joint mechanism and hence the coupling devices as a whole in order to achieve a design of equal strength.

According to an embodiment of the invention, the connection area can be bordered in the axial direction by at least one axial surface of the first thread-reinforced joint mechanism facing away from the first flange and at least one axial surface of the second thread-reinforced joint mechanism facing away from the second flange. The axial surfaces of the first thread-reinforced joint mechanism and of the second thread-reinforced joint mechanism defining the connection area can be oppositely situated.

The first thread-reinforced joint mechanism and the second thread-reinforced joint mechanism can be connected by means of fastening means to the first and second flanges. Furthermore, the at least one connection assembly can also be connected by means of fastening means to the first thread-reinforced joint mechanism and the second thread-reinforced joint mechanism. The fastening means can be screws, bolts, or the like.

The first thread-reinforced joint mechanism can be connected starting from the connection area by means of fastening means to the at least one connection assembly and the at least one first flange. The second thread-reinforced joint mechanism can be connected starting from the connection area by means of fastening means to the at least one connection assembly and the second flange. As mentioned previously, the fastening means can be screws, for example. In this case, the screws are screwed in starting from the connection area that is established between the two thread-reinforced joint mechanisms. The screw heads of the screws for connecting the thread-reinforced joint mechanisms to one of the flanges and for connecting the joint mechanisms to the at least one connection assembly are all located within the connection area, which extends in the axial direction between the first thread-reinforced joint mechanism and the second thread-reinforced joint mechanism. In this way, it is ensured that the thread-reinforced joint mechanisms can each be connected from an axial side of the thread-reinforced joint mechanisms both to the flange associated with them and to the at least one connection assembly. In other words, the screw head of the screws are always accessible for loosening and tightening.

The at least one first thread-reinforced joint mechanism and the at least one second thread-reinforced joint mechanism can have at least one first coupling element that is associated with the at least one connection assembly and at least one second coupling element that is associated with the corresponding first or second flange. The thread-reinforced joint mechanisms can thus comprise at least two types of coupling element. The at least one first coupling element is provided for coupling the thread-reinforced joint mechanism to the connection assembly. The at least one second coupling element is designed to couple or connect to one of the flanges. The at least one first coupling element and the at least one second coupling element can cooperate with fastening means in order to produce a coupling between the thread-reinforced joint mechanisms, the at least one connection assembly, and one of either the first or second flange. The at least one coupling element can have a portion with a specified screw head. The portion of the at least one coupling element can have the outer contour of a specified screw head, for example. This specified screw head can be a hexagonal head, for example. The at least one connection assembly can rest against the specified screw head of the at least one first coupling element.

In order to prevent the thread-reinforced joint mechanism from being damaged during the connecting of the connection assembly to one of the thread-reinforced joint mechanisms, it may be necessary to hold the at least one first coupling element counter to its screw head portion using a wrench. In order to enable the wrench to be positioned exactly, and to prevent stresses from being introduced into the thread-reinforced joint mechanism as a result of counter-holding with the wrench, a positioning device for the wrench can be provided. This positioning device fixes the wrench in its specified position for counter-holding, so that no stresses can be introduced into the thread-reinforced joint mechanism by means of the wrench. The positioning device can have a pin, for example, that cooperates with a corresponding recess in the wrench and/or connection assembly.

The at least one connection assembly can rest against at least one bearing portion of the at least one coupling element. The bearing portion can be a portion with a specified screw head. According to this embodiment, the bearing portion can have the outer contour of a specified screw head. For example, the bearing portion of the first coupling element can be embodied in the form of a hexagonal head.

Fastening means for connecting to the first flange or the second flange can extend through the at least one second coupling element. The at least one first coupling element can partially receive fastening means for connecting the at least one connection assembly to the first thread-reinforced joint mechanism or the second thread-reinforced joint mechanism. The fastening means, which extends through the at least one second coupling element, couples one of the thread-reinforced joint mechanisms to the respective flange. To achieve this, the fastening means engages in a fastening manner with the flange. The fastening means that extends through the at least one second coupling element can be received partially in a corresponding opening in one of the flanges, for example, thus creating a connection between the thread-reinforced joint mechanism and the flange. The thread-reinforced joint mechanism can be screwed to one of the flanges, for example using fastening means in the form of screws that extend through the at least one coupling element. In contrast, the at least one first coupling element can receive fastening means for connecting the connection assembly to one of the thread-reinforced joint mechanisms, thus establishing a connection. The first coupling elements can have an internal thread, for example, into which the fastening means for fastening the thread-reinforced joint mechanism to the connection assembly can be screwed.

According to an embodiment of the invention, the at least one connection assembly can have at least one first part and at least one second part. The at least one connection assembly can thus have a multi-part design. The at least one first part and the at least one second part of the at least one connection assembly can be identical. This makes it possible to reduce the manufacturing costs for the coupling device by virtue of the greater unit quantity for the identical first and second parts.

The at least one first part and the at least one second part of the at least one connection assembly can be coupled together in a torque-transmitting manner by means of corresponding teeth. The at least one first part and the at least one second part preferably each have teeth for this purpose in an area near the center or in an area near the center axis of the coupling device that engage in one another, thus establishing a torque-transmitting coupling between the two parts. Besides the connection via the teeth, the two parts of the at least one connection assembly can also be interconnected by at least one fastening means. The at least one first part and the at least one second part can also be connected to one another without teeth, for example exclusively using fastening means. In this case, the at least one first part and the at least one second part can be embodied with only regular surfaces. The first part can thus be connected to the first flange and the second part to the second flange. The first flange can be connected to one portion of a drivetrain, and the second flange can be connected to another portion of the drivetrain. In this state, the two portions of the drivetrain can be displaced toward one another and connected by means of the first part and the second part of the connection assembly. In this case, the first part and the second part of the connection assembly can be connected to one another exclusively by fastening means, such as screws, for example. However, such an assembly is only necessary in the case of very special drivetrains. In the coupling device according to the invention, the at least one connection assembly is generally always inserted radially as an assembly and then connected to the joint mechanisms and flanges.

The at least one connection assembly can also be embodied such that as much mass as possible is located in an area near the center, i.e., in an area near the axis of rotation of the coupling device. In this way, the mass moment of inertia can be kept low. With a low mass moment of inertia, the dynamic characteristics of the coupling device can also be enhanced.

According to an embodiment of the invention, the coupling device can have at least one centering device for radially supporting the at least one connection assembly. The at least one centering device can have at least one joint assembly that is arranged in the axial direction between the first thread-reinforced joint mechanism and the second thread-reinforced joint mechanism.

The radial supporting of the at least one connection assembly is achieved by means of the at least one centering device. In the coupling device according to the invention, the radial supporting of the at least one connection assembly achieved by means of the at least one centering device serves to reduce dynamic imbalances and the vibrations associated therewith. The at least one centering device or its at least one joint assembly can support the at least one connection assembly radially, particularly even in the event of radial or angular offset. The at least one joint assembly permits angular offsets and radial offsets between the shaft sections to be connected but simultaneously supports the at least one connection assembly. Dynamic imbalances can be reduced in this way. Furthermore, axial offsets between the shaft sections to be connected can also be compensated for.

The centering device can support the connection assembly radially without the need for slide bearings or sliding movements. Since the at least one joint assembly of the at least one centering device is arranged between the first thread-reinforced joint mechanism and the second thread-reinforced joint mechanism, the connecting pieces on the shafts for the coupling device according to the invention do not need to be changed.

The at least one joint assembly is arranged in the axial direction between the first thread-reinforced joint mechanism and the second thread-reinforced joint mechanism. The at least one joint assembly is thus spaced apart in the axial direction both from the first thread-reinforced joint mechanism and from the second thread-reinforced joint mechanism. The at least one joint assembly is arranged in the axial direction outside of the axial extension of the first thread-reinforced joint mechanism and the second thread-reinforced joint mechanism. In order to enable supporting of the at least one connection assembly in the radial direction, the at least one centering device is radially rigid with its at least one joint assembly but axially pliant, torsionally pliant, and also flexurally pliant.

Since the at least one joint assembly is arranged in the axial direction between the first thread-reinforced joint mechanism and the second thread-reinforced joint mechanism, the at least one joint assembly is arranged so as to be offset axially with respect to the bending points of the first thread-reinforced joint mechanism and the second thread-reinforced joint mechanism. The bending points of the first thread-reinforced joint mechanism and the second thread-reinforced joint mechanism are located on the center axis of the thread-reinforced joint mechanisms within the axial extension of the thread-reinforced joint mechanisms. In this way, what can be achieved, among other things, is that no slide bearings and also no sliding movements are necessary for the radial supporting of the at least one connection assembly.

According to one embodiment, each of the at least one joint assembly can be spaced a specified distance in the axial direction from the first thread-reinforced joint mechanism and the second thread-reinforced joint mechanism. The at least one joint assembly can thus be spaced apart from the first thread-reinforced joint mechanism by a first distance and from the second thread-reinforced joint mechanism by a separation distance in the axial direction. The first distance and the second distance can be equal.

The at least one joint assembly can be arranged between mutually facing axial end surfaces of the first flange and of the second flange. The axial end surfaces of the first flange and of the second flange can be embodied on a tubular portion of the first flange and second flange, respectively—that is, on the front sides of the tubular portions. The tubular portion of the first flange and of the second flange can extend through a central opening in the first thread-reinforced joint mechanism and second thread-reinforced joint mechanism, respectively.

The at least one joint assembly can be arranged between mutually facing axial sides of the first thread-reinforced joint mechanism and the second thread-reinforced joint mechanism. The at least one first thread-reinforced joint mechanism and the at least one second thread-reinforced joint mechanism can border a space between them in the axial direction in which, besides the at least one connection assembly, the at least one centering device is also arranged completely with its at least one joint assembly. The at least one centering device can enclose the at least one connection assembly radially and support the at least one connection assembly radially.

According to one embodiment, at least one coupling element can be associated with the first flange and at least one coupling element can be associated with the second flange in order to couple the first flange and the second flange with the at least one joint assembly. The coupling elements can be coupled in positions with the at least one joint assembly that are located in the axial direction between the at least one first thread-reinforced joint mechanism and the at least one second thread-reinforced joint mechanism. The coupling positions can be spaced apart in the axial direction by a specified distance from the first thread-reinforced joint mechanism and the second thread-reinforced joint mechanism.

According to a development of the invention, the at least one joint assembly can have at least one joint diaphragm and at least one second joint diaphragm. For example, the at least one first joint diaphragm can be coupled by means of the at least one coupling element with the first flange, and the at least one second joint diaphragm can also be coupled by means of at least one coupling element with the second flange.

The distance between the at least one first joint diaphragm and the at least one second joint diaphragm in the axial direction can be less than the distance between the first thread-reinforced joint mechanism and the second thread-reinforced joint mechanism. To put it another way, the at least one joint assembly with the at least one first joint diaphragm and the at least one second joint diaphragm is spaced apart from the axial sides of the thread-reinforced joint mechanisms, which face one another. The distance between the at least one first joint diaphragm and the at least one second joint diaphragm corresponds to the gimbal length of the at least one joint assembly. The gimbal length of the coupling device over is determined from the distance in the axial direction between the first thread-reinforced joint mechanism and the second thread-reinforced joint mechanism. The gimbal length of the at least one centering device can therefore be shorter than the gimbal length of the coupling device.

According to one embodiment, the at least one joint assembly can have at least one third joint diaphragm. The at least one third joint diaphragm can be arranged in the axial direction between the at least one first and the at least one second joint diaphragm. The at least one third joint diaphragm can be connected to the at least one connection assembly. To put it differently, a connection can be established by means of the at least one third joint diaphragm beyond the at least one connection assembly and the at least one centering device or the at least one joint assembly of the centering device. In other words, the at least one third joint diaphragm can connect the at least one connection assembly to the at least one centering device radially in order to support the at least one connection assembly radially.

According to a development of the invention, the joint diaphragms of the at least one joint assembly can be connected to one another. Expressed differently, the at least one first joint diaphragm, the at least one second joint diaphragm, and the at least one third joint diaphragm can be interconnected.

All of the joint diaphragms of the at least one joint assembly can be arranged between mutually facing axial side surfaces of the first thread-reinforced joint mechanism and the second thread-reinforced joint mechanism. The joint diaphragms of the at least one joint assembly can each be spaced apart from the thread-reinforced joint mechanisms by a specified axial distance. The joint diaphragm of at least one joint assembly can be arranged in the axial direction outside of the first thread-reinforced joint mechanism and the second thread-reinforced joint mechanism.

The joint diaphragms of the at least one joint assembly can be made of sheet metal or of a thread-reinforced elastomer. However, the joint diaphragms can also be made of other materials.

The joint diaphragms of the at least one joint assembly can extend in the radial direction. The joint diaphragms can have arms that extend radially outward in the manner of spokes from a central region of the joint diaphragm. The joint diaphragms can each have coupling elements on the radial ends of their arms by means of which the joint diaphragms can be coupled with other elements of the centering device. The joint diaphragms of the at least one joint assembly can be connected to one another in the radial direction outside of the at least one connection assembly.

The at least one first joint diaphragm can be associated with the first flange and the at least one second joint diaphragm can be associated with the second flange, in which case the first joint diaphragm and the second joint diaphragm can be coupled with the respective flange.

The present invention further relates to a thread-reinforced joint mechanism for a coupling device of a vehicle drive. The thread-reinforced joint mechanism according to the invention comprises the features described herein.

Additional embodiments of the invention are indicated in the dependent claims.

The thread-reinforced joint mechanism according to the invention can be used with a coupling device of the type described above, for example.

The thread-reinforced joint mechanism according to the invention comprises a plurality of first coupling elements, a plurality of second coupling elements, and at least one yarn package. The at least one thread package can couple at least one first coupling element and at least one second coupling element with one another in a force-transmitting manner. Furthermore, the thread-reinforced joint mechanism comprises at least one support means for axially guiding the at least one thread package on at least one first or at least one second coupling element. The at least one thread package and the coupling elements are enclosed at least partially by at least one elastic member. The first coupling elements have at least one portion with an internal thread. The first coupling elements are arranged alternately with the second coupling elements.

The at least one elastic member serves, among other things, to receive compressive forces that can occur during the transmission of torque during the operation of the coupling device. In this context, the at least one thread-reinforced joint mechanism can be formed by several elastic joint members, each of which has at least one thread package. To put it another way, several elastic members are connected to one another in order to form the thread-reinforced joint mechanism and enable torques to be transmitted. Alternatively, the thread-reinforced joint mechanism can have an elastic member in which all of the components of the thread-reinforced joint mechanism can be embedded at least partially. The elastic member or the elastic members can be made of an elastomer, a thermoplastic elastomer, a polymer, or rubber, for example. The thread-reinforcement limits the tensile stresses in the at least one elastic member. In this way, undesired relaxation-related phenomena in the at least one elastic member are further reduced.

The at least one thread package can be embodied as a lug that winds around at least one first and at least one second coupling element, thereby coupling them together in a force-transmitting manner. The thread-reinforced joint mechanism can also have a plurality of thread packages. The lug-like thread packages can be arranged in the manner of a ring and be connected to one another by means of at least one first or second coupling element. A first or a second coupling element can be connected to two lug-like thread packages, for example, in which case tensile stress is applied to one of the thread packages and the other is arranged in a pressure path in which compressive forces are transmitted via the at least one elastic member.

The first coupling elements can have at least one portion with an internal thread. Since the first coupling elements is associated with the at least one connection assembly, the at least one connection assembly can be connected by means of a fastening means, for example in the form of a screw, directly to one of the thread-reinforced joint mechanisms. Expressed differently, a screw can be screwed into the internal thread of the coupling element of the thread-reinforced joint mechanism, for example, in order to connect the thread-reinforced joint mechanism to the at least one connection assembly.

The first coupling elements can have a portion with a specified screw head. If the first coupling elements have a thread, it may be necessary in certain circumstances to counter-hold this first coupling element using a wrench while screwing a screw into one of the first coupling elements. This is intended to prevent torque from being transmitted to the thread-reinforced joint mechanism during screwing, for example. For this reason, a screw head for counter-holding can be provided on the at least one coupling element. The specified screw head can be hexagonal, for example.

The first and second coupling elements can each be received in at least one outer bushing. The outer bushings of the elastic joint member can be identical independently of whether they receive a first coupling element or a second coupling element.

The first coupling elements can have a radial supporting portion on which the outer bushings can be supported. The radial supporting portion can be a radially circumferential projection. The supporting portion can be adjacent to the portion with the specified screw head.

At least the first coupling elements can have at least one securing member. The at least one securing member serves to secure the first coupling elements on the thread-reinforced joint mechanism. Particularly in the event that the first coupling elements have an internal thread, the at least one securing member ensures that the first coupling elements cannot be pulled out of the thread-reinforced joint mechanism while the coupling device is in operation. Accordingly, the at least one securing member can ensure that the first coupling elements also remain in their specified position on the thread-reinforced joint mechanism while the thread-reinforced joint mechanism is in operation.

The at least one securing member can be arranged on an axial end region of the at least one first coupling element. The at least one securing member can be embodied in the form of a screw and be screwed into one of the first coupling elements if the first coupling elements have an internal thread. The at least one securing member can be mounted directly on the thread-reinforced joint mechanism during the manufacture of the thread-reinforced joint mechanism by the manufacturer thereof.

The at least one securing member can be embodied such that unintentional loosening of the at least one securing member can be prevented. The at least one securing member can be embodied in the form of a safety screw, one-way screw, or breakaway screw that can no longer be loosened once tightened. This is to prevent the at least one securing member from being wrongly or unintentionally loosened during the attachment of the thread-reinforced joint mechanism. The removal of such a securing member is possible only with a considerable expenditure of time and/or special tools. If the at least one securing member is embodied in the form of a screw, the securing member can additionally have a screw locking device, so that the loosening of the securing member as a result of vibrations or the like occurring during operation is not possible. Such screw locking devices can be of a mechanical nature, such as in the case of circlips or snap rings, or of a chemical nature, such as in the case of adhesives or the like. For example, the screw locking means sold by Henkel under the Loctite brand can be used here.

According to one embodiment, the at least one connection assembly can have at least one intermediate part. The at least one intermediate member can be arranged in the axial direction between the first part and the second part. In other words, the connection assembly can have a three-part design. The first part and the second part can have a base body that is relatively flat and/or thin in the axial direction.

The at least one first part and the at least one second part can have at least one projection. The at least one projection can be provided with at least one opening for at least one fastening means. The at least one fastening means can extend through the opening. The at least one projection extends in the axial direction. The at least one projection can extend starting from the at least one base body of the first part and of the second part in the axial direction. For example, the at least one projection can extend in the assembled state of the coupling device in the direction of the first thread-reinforced joint mechanism or the second thread-reinforced joint mechanism. The at least one opening of the at least one projection can be stepped. A ledge can be provided in the opening starting at which the diameter of the opening changes. The opening can be embodied such that it can receive at least one fastening means at least partially. The fastening means extending through the at least one opening of the at least one projection can be used to connect the first part or the second part to the first or second thread-reinforced joint mechanism associated with the first part or the second part. The at least one fastening means can be a head screw, for example with a hexagon socket screw head. The screw head of the screw can rest against an offset in the opening of the projection. The screw head can be countersunk in the opening in the at least one projection at least partially, so that the screw head constitutes very little or no impediment during the assembly of the coupling device.

The at least one intermediate member can be detachably connected to the at least one first part and the at least one second part such that it can be removed from the coupling device in the radial direction. This ensures that the at least one first part, the at least one second part, and also the at least one center part can be inserted in the radial direction and connected to one another in the connection area. Furthermore, the at least one first part and the at least one second part can thus be connected to the first thread-reinforced joint mechanism or the second thread-reinforced joint mechanism. In other words, starting from the connection area, the first thread-reinforced joint mechanism can be connected to the first part of the at least one connection assembly and the first flange, and the second thread-reinforced joint mechanism can be connected to the at least one second part of the at least one connection assembly and the second flange.

It is thus possible for all of the components of the coupling device to be connected or fastened to one another starting from the connection area. Through the dimensioning of the at least one center part, the coupling device can be flexibly adapted to different vehicle types and different drivetrains of railway vehicles. The first part and the second part of the at least one connection assembly can be screwed with the at least one intermediate member. The screws can each extend from the direction of the first and/or the second thread-reinforced joint mechanism into the at least one intermediate member. The screw heads of the screws can rest against the first part and/or the second part of the at least one connection assembly and extend through the first part and the second part into the at least one center part. The screws can also extend through the first part, the center part, and the second part and be secured on the sides of the first or second part using a nut.

The at least one connection assembly can have positioning means that serves to position the individual parts of the at least one connection assembly to one another. In the two-part connection assembly, it is possible for only the first part and the second part to have positioning means.

The positioning means can be formed by corresponding projections and recesses on the first part, the second part, and the center part.

A force fit or a form fit can be created between the individual parts of the connection assembly by means of the axially interlocking positioning means. These axially interlocking positioning means do not impede the radial removal of the connection assembly and of the individual parts of the connection assembly, since the at least one thread-reinforced joint mechanism is elastic or pliant in the axial direction to a specified extent. Due to the pliability of the thread-reinforced joint mechanisms in the axial direction, the individual parts of the at least one connection assembly can be moved apart in the axial direction while being removed, thus facilitating the radial removal thereof. The interlocking positioning means can provide the advantage that the torque transmission can take place at least in part in a form-fitting manner and imbalances can be minimized.

The at least one intermediate member can be annular.

The present invention further relates to a drive arrangement for a railway vehicle with at least one motor and at least one transmission, with a motor output shaft and a transmission input shaft being interconnectable by means of at least one coupling device of the type described above.

The motor output shaft and the transmission input shaft can have at least one connecting piece for connecting to the at least one coupling device. Such a connecting piece is often also referred to in this technical field as a "cone."

The at least one connecting piece can be received in an opening of the first flange and/or of the second flange.

The at least one connecting piece can be received in an opening of the first flange or of the second flange. The opening of the first flange and/or of the second flange extends along the center axis of the coupling device. The opening can thus be provided in a central region of the first flange and of the second flange. The opening can extend through a tubular portion of the first and of the second flange. The tubular portion of the first and of the second flange can be received in a central opening of the first or of the second thread-reinforced joint mechanism or extend through the central opening of the first or of the second thread-reinforced joint mechanism.

At least one bushing can be arranged between the first flange and/or the second flange and the respective at least one connecting piece. The at least one bushing can create a connection between the at least one connecting piece and the first flange and/or the second flange. The first flange and the second flange can be connected by means of a force fit to the at least one connecting piece. If at least one bushing is provided, a press-fit connection exists between the connecting piece of the at least one bushing and the flange. The at least one bushing can form a slip clutch. If an overload—that is, excessive torque over the at least one connecting piece—acts on the first flange or the second flange, the at least one bushing permits a relative torsion between the at least one connecting piece and the first flange or the second flange. The at least one connecting piece can "slip" in the event of an overload, that is, it can rotate freely relative to the associated first or second flange. Damage to the coupling device and the components connected thereto can be prevented in this way. In the case of an overload, the force fit between the outer peripheral surface of the bushing and the first or the second flange is released, i.e., overcome, so that the connecting piece can "slip" with the bushing in the opening of the flange.

According to one embodiment, at least one securing means can be provided. The at least one securing member can hold the first or the second flange on the at least one connecting piece. The at least one securing means can extend in a radial direction. The at least one securing means can be disc-shaped. The at least one securing means can rest at least partially against the first flange or the second flange. The at least one securing means serves particularly to secure the first flange and the second flange in the axial direction in the case of an overload, since in that case the at least one connecting piece can rotate relative to the first flange or the second flange. As a result of the relative torsion between the connecting piece and the first flange or the second flange, the corresponding flange can lose its purchase in the axial direction on the at least one connecting piece. The at least one securing member can be connected to the at least one connecting piece. Furthermore, the at least one securing member can be fixed in its position on the at least one connecting piece by a positioning pin.

The at least one connecting piece can have at least one projection that extends in the radial direction. The at least one radial projection on the at least one connecting piece can serve to secure the at least one bushing in the axial direction. This is true particularly in a case in which the at least one connecting piece rotates freely relative to the first flange or the second flange under an overload.

According to one embodiment, at least one centering sleeve can be housed in the at least one connecting piece. The at least one centering sleeve can cooperate with at least one centering bolt. The at least one centering bolt can be provided on the at least one connection assembly. For example, the at least one centering bolt can be arranged on the first or second part of the at least one connection assembly. Centering increases the radial stiffness of the thread-reinforced joint mechanism. As a result, imbalances that can occur in the event of radial deflections in a "floating" connection assembly can be prevented or minimized.

The at least one centering bolt can be screwed to the first part or the second part. The at least one centering bolt can be inserted into at least one centering sleeve.

The at least one centering sleeve can be elastic in order to dampen impacts and vibrations. The at least one centering sleeve can also serve to permit axial relative movements between the first connecting element and the second connecting element of the at least one centering device over a specified distance. The at least one centering sleeve can have an outer sleeve and an inner sleeve that are interconnected by at least one elastic element. In addition to the axial relative movements, the at least one centering sleeve also enables angular offsets to be compensated for. In order to absorb and equalize the axial relative movements and the angular offsets, the elastic element between inner bushing and outer bushing is elastically deformed. To put it differently, a deflection of the centering bolt, for example, relative to the connecting element then occurs with the centering sleeve under the elastic deformation of the elastic element of the at least one centering sleeve.

According to one embodiment, the at least one connecting element can have at least one borehole that serves to apply a specified oil pressure. Via the at least one borehole in the at least one connecting element, an oil pressure can be applied to the connecting element which acts on the first connecting element and the corresponding flange such that the flange can be pressed away from the first connecting element. For this purpose, the at least one borehole can cooperate with a groove on the outer peripheral surface of the connecting element, for example. It is also possible for several boreholes to be embodied in the at least one connecting element. For example, one of the boreholes can also be provided for the purpose of releasing the at least one centering sleeve from the first connecting element. The boreholes can extend in the axial direction and in the radial direction through the connecting element. The oil pressure for pressing one of the flanges away from the connecting element can be 2000 bar, for example. The centering sleeve can be pressed out of the at least one connecting piece by an oil pressure of 200 bar, for example.

The at least one joint assembly can be connected to the at least one connecting piece. The at least one connecting piece can have a threaded opening that can be used for connecting to the at least one joint assembly by means of at least one screw. The first joint diaphragm can be connected to one connecting piece and the second joint diaphragm can be connected to another connecting piece.

BRIEF DESCRIPTION OF THE SEVERAL VIEWS OF THE DRAWINGS

An embodiment of the invention will be described below for the sake of example with reference to the enclosed figures.

DETAILED DESCRIPTION OF EMBODIMENTS OF THE INVENTION

Figure 1:
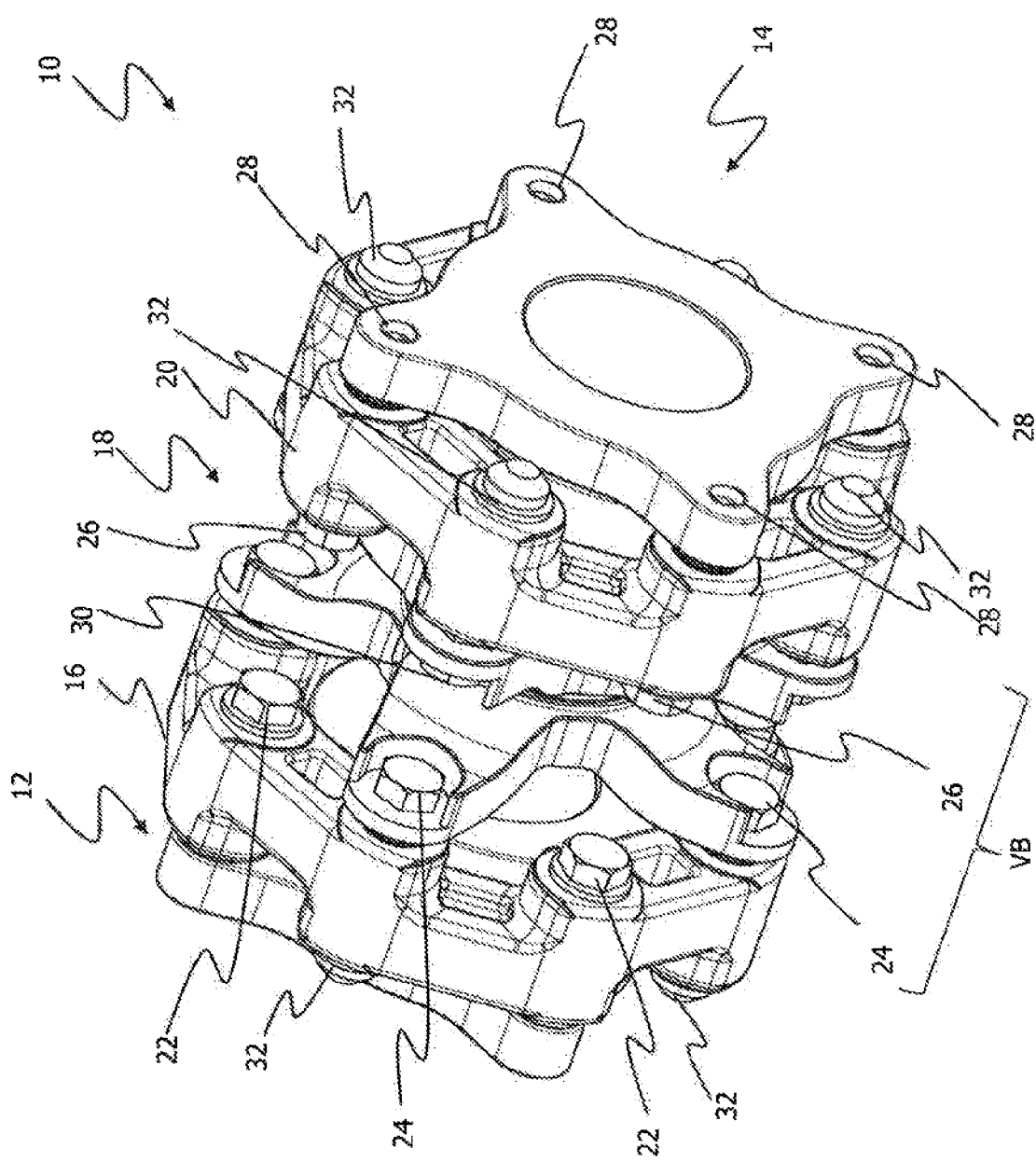
FIG. 1 shows a perspective view of a coupling device according to the invention.

FIG. 1 shows a perspective view of the coupling device 10 according to one embodiment of the invention.

The coupling device 10 comprises a first flange 12 and a second flange 14. A first thread-reinforced joint mechanism 16, a connection assembly 18, and the second thread-reinforced joint mechanism 20 are provided between the first flange 12 and the second flange 14.

The first thread-reinforced joint mechanism 16 is connected by fastening means in the form of screws 22 to the first flange 12. In order to connect the first thread-reinforced joint mechanism 16 to the connection assembly 18, fastening means are provided in the form of screws 24.

The second thread-reinforced joint mechanism 20 is connected by fastening means in the form of screws 26 to the second flange 14. The second flange 14 has openings 28 into which the screws 26 acting as fastening means can be screwed. The connection assembly 18 is connected by fastening means in the form of screws 30 to the second thread-reinforced joint mechanism 20.

Securing members 32 can be seen on each of the thread-reinforced joint mechanisms 16 and 20. The securing members 32 are associated with the screws 24 and 30, respectively, which serve to connect the connection assembly 18 to the thread-reinforced joint mechanisms 16 and 20. Accordingly, the securing members 32 are intended to prevent the thread-reinforced joint mechanisms 16 and 20 from detaching from the screws 24 and 30 and the coupling elements associated therewith (not shown in FIG. 1) during operation of the coupling device 10.

Furthermore, it can be seen in FIG. 1 that the thread-reinforced joint mechanisms 16 and 20 establish a connection area VB between them. All of the screws 22, 24, 26, 30 can be loosened or tightened starting from this connection area VB. This is also made clear by the fact that the screw heads of the screws 22, 24, 26, 30 are arranged in the connection area VB or are accessible via the connection area VB.

Figure 2:
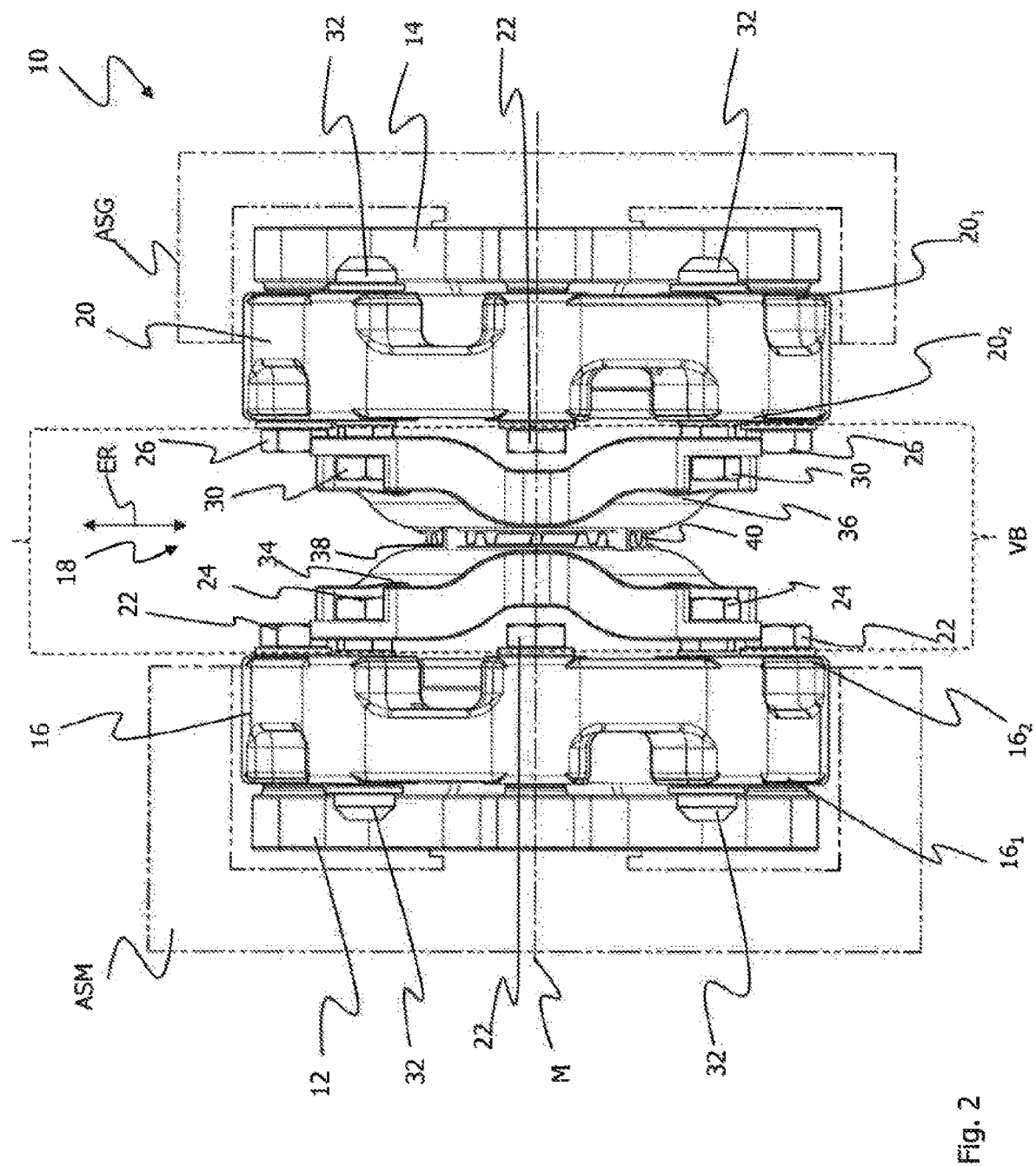
FIG. 2 shows a side view of the coupling device according to the invention.

FIG. 2 shows a side view of the coupling device 10 in an exemplary state of installation.

In FIG. 2, the respective components that are adjacent to the coupling device 10 are shown with dotdashed lines. The connecting piece ASM on the motor is located in the direction of the axis M on the left side in FIG. 2. The transmission connecting piece ASG is shown in FIG. 2 to the right toward the axis M.

In FIG. 2, the first flange 12, the first thread-reinforced joint mechanism 16, the connection assembly 18 as well as the second thread-reinforced joint mechanism 20 and the second flange 14 are visible.

The connection assembly 18 has a first part 34 and a second part 36. The first part 34 has teeth 38 in its central region. Similarly, the second part 36 has teeth 40. The teeth 38 and 40 of the two parts 34 and 36 of the connection assembly 18 engage in one another in order to enable torque transmission between the two parts 34 and 36.

The first thread-reinforced joint mechanism 16 is screwed by means of the screws 22 to the first flange 12. The second thread-reinforced joint mechanism 20 is screwed by means of the screws 26 to the second flange 14. The connection assembly 18 is screwed by means of the screws 24 to the first thread-reinforced joint mechanism 16 and by means of the screws 30 to the second thread-reinforced joint mechanism 20. The screws 22, 24, 26 and 30 are accessible via the connection area VB. The connection area VB extends in the direction of the axis M between the first thread-reinforced joint mechanism 16 and the second thread-reinforced joint mechanism 20. The connection area VB is also accessible in the radial direction and in the direction of the arrow ER. The screw heads of the screws 22, 24, 26 and 30 are all located in the connection area VB and can be tightened and loosened in this connection area VB.

It is clear from the illustration of the motor connecting piece ASM and the transmission connecting piece ASG that the first flange 12 and the second flange 14 are accessible only to a limited extent. The same applies to the axial side $16_1$ of the first thread-reinforced joint mechanism 16 facing toward the first flange 12 and the axial side $20_1$ of the second thread-reinforced joint mechanism 20 facing toward the second flange 14. Accordingly, the flanges 12 and 14 as well as the axial sides $16_1$ and $20_1$ of the thread-reinforced joint mechanisms 16 and 20 can either not be reached or are not accessible due to the motor connecting piece ASM and the transmission connecting piece ASG.

Only the sides $16_2$ and $20_2$ of the joint mechanisms 16 and 20 facing away from the flanges 12 and 14 are accessible via the connection area VB. It is clear from this that the components of the coupling device 10 can be fed in and fastened or connected only in the radial direction, i.e., in the direction of the arrow ER. The individual components can only be fastened and connected via the connection area VB established between the two thread-reinforced joint mechanisms 16, 20. The connection area VB is established via the axial side $16_2$ of the thread-reinforced joint mechanism 16 facing toward the first flange 12 and the axial side $20_2$ of the second thread-reinforced joint mechanism 20 facing toward the second flange 14.

The flanges 12 and 14 are connected to the motor connecting piece ASM and the transmission connecting piece ASG. Subsequent to that, the first thread-reinforced joint mechanism 16 is introduced in the direction of the arrow ER and connected via the connection area VB by means of the screws 22 to the first flange 12. The same applies to the second thread-reinforced joint mechanism 20, which is also introduced in the direction of the arrow ER and connected via the connection area VB by means of the screws 26 to the second flange 14. The connection assembly 18 is then introduced in the direction of the arrow ER, i.e., radially, and screwed by means of the screws 24 to the first thread-reinforced joint mechanism 16 and by means of the screws 30 to the second thread-reinforced joint mechanism 20. In this way, all of the components of the coupling device 10 can be introduced radially in the direction of the arrow ER and connected to one another. The thread-reinforced joint mechanisms 16 and 20 can be connected by means of the connection area VB to the respective flange 12 or 14 and the connection assembly 18.

On the axial sides $16_1$ and $20_1$ of the thread-reinforced joint mechanisms 16 and 20, one can see the securing members 32, which are intended to prevent the thread-reinforced joint mechanisms 16, 20 from being taken off of the screws 24, 30 or coupling elements (not shown) associated with these screws during operation of the coupling device 10. The securing members 32 are already mounted during the manufacture of the thread-reinforced joint mechanism 16, 20 and can then no longer be loosened.

Figure 3:
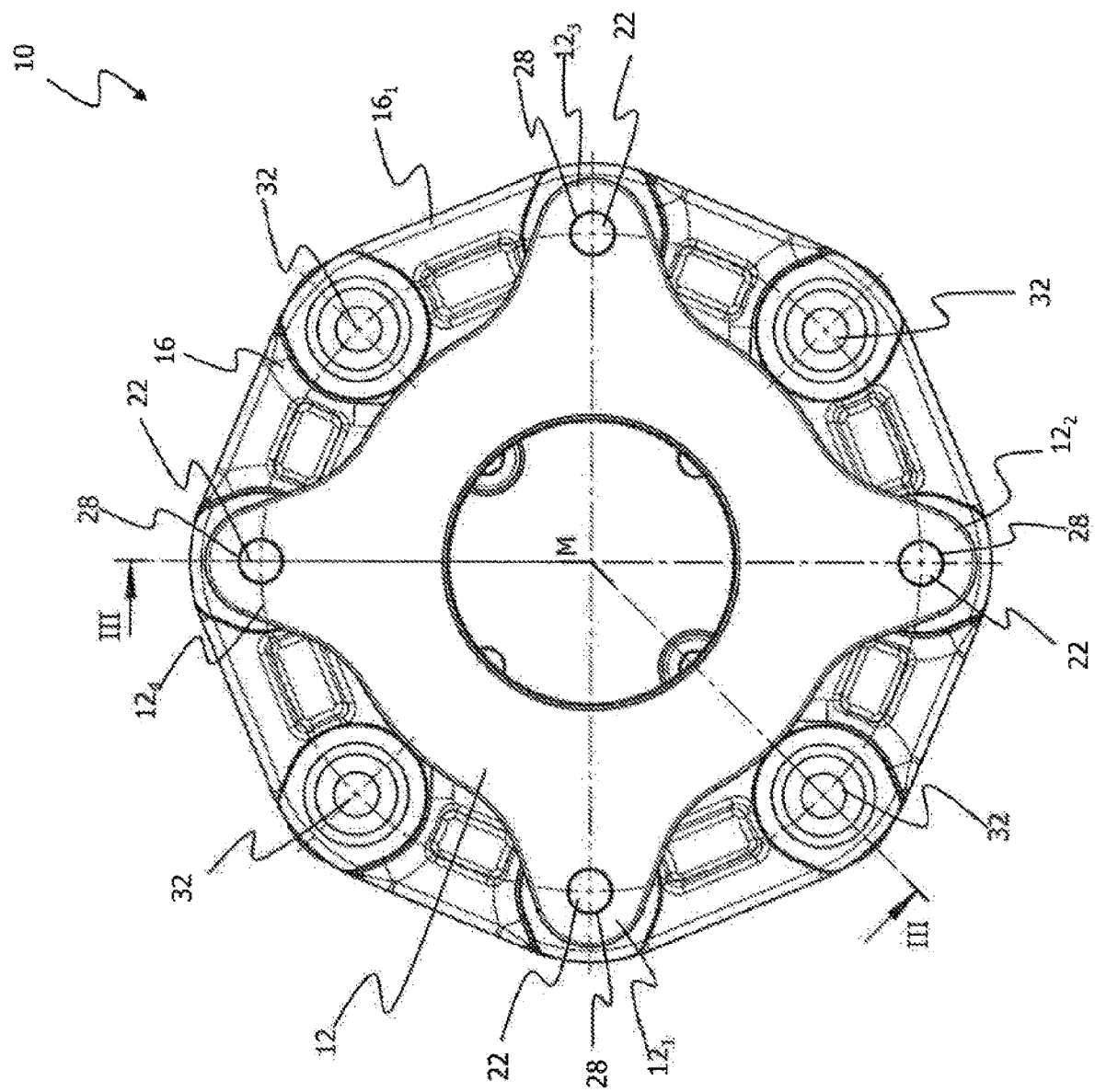
FIG. 3 shows a front view of the coupling device according to the invention.

FIG. 3 shows a front view of the coupling device 10.

FIG. 3 shows the first flange 12 as well as the first thread-reinforced joint mechanism 16.

The first flange 12 comprises four fastening projections $12_1$ to $12_4$. Openings 28 are formed in these fastening projections $12_1$ to $12_4$ that are able to receive the screws 22. The screws 22 serve to connect the first thread-reinforced joint mechanism 16 to the first flange 12. The securing members 32 can be seen on the axial side $16_1$ of the thread-reinforced joint mechanism 16. The securing members 32 are embodied such that they cannot be loosened once they have been tightened. For example, the securing members 32 can be safety screws, one-way screws, or breakaway screws whose screwable heads break off under a specified torque.

The second flange 14 (see FIG. 1) is embodied like the first flange 12 and is connected in similar fashion to the second thread-reinforced joint mechanism 20.

Figure 4:
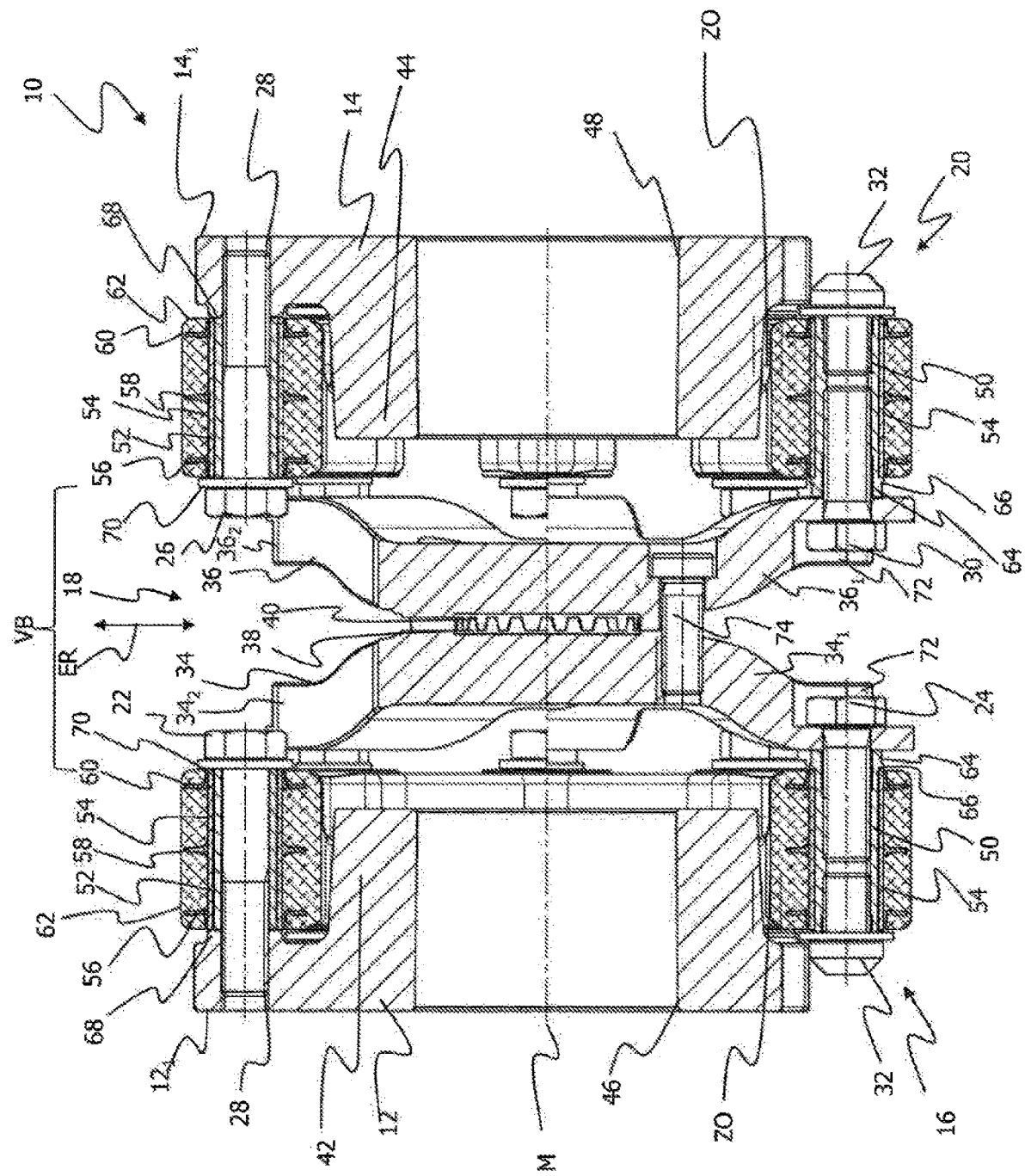
FIG. 4 shows a sectional view along the sectional line III-III in FIG. 3.

FIG. 4 shows a sectional view along the sectional line III-III in FIG. 3.

The sectional view according to FIG. 4 shows the first flange 12, the first thread-reinforced joint mechanism 16, the connection assembly 18, the second thread-reinforced joint mechanism 20, and the second flange 14.

The first flange 12 has a tubular portion 42 that extends through a central opening ZO of the first thread-reinforced joint mechanism 16. The first flange 14 also has a tubular portion 44 that extends through the central opening ZO of the second thread-reinforced joint mechanism 20. The flanges 12 and 14 also have a central opening 46 and 48, which can be used to receive a shaft section (not shown), for example.

The thread-reinforced joint mechanisms 16 and 20 have first coupling elements 50 and second coupling elements 52. The first and second coupling elements 50 and 52 are each received in outer bushings 54. Collar elements 56, 58 and 60 are respectively provided on the outer bushings 54. The collar elements 56, 58 and 60 form a support means for supporting and axially guiding the thread packages (not shown) of the thread-reinforced joint mechanisms 16, 20. The two outer collar elements 56 and 60 in the axial direction are L-shaped and have a portion that extends in the axial direction and a tube section. The tube section rests against the outer bushings 54. The collar element 58 arranged between the two axially outside collar elements 56 and 60 is disc-shaped and has a thickened portion with which the collar element 58 is fastened to the outer bushing 54. The outer bushings 54 and the collar elements 56, 58 and 60 are embedded at least partially in an elastic member 62.

The first coupling elements 50 are tubular and have an internal thread. Furthermore, a specified screw head is provided on the first coupling elements 50 and on an axial end portion 64 of the coupling elements 50. The screw head can be hexagonal, for example. A radially circumferential projection 66 is adjacent to the portion 64 with the screw head that forms a supporting portion for the outer bushings 54.

When compared to the first coupling elements 50, the second coupling elements 52 are also tubular but have no internal thread and the like. The screws 22 and 26 extend through the second coupling elements 52, which screws 22 and 26 serve to connect the thread-reinforced joint mechanisms 16 and 20 to the respective flange 12 or 14. Openings 28 are embodied in the flanges 12 and 14 that have an internal thread. The openings 28 are embodied in the flange arms $12_1$ and $14_1$ of the flanges 12 and 14, with only the flange arms $12_1$ and $14_1$ being shown in FIG. 4. The flange arms $12_1$ and $14_1$ also have a support lug 68 on which the second coupling elements 52 and the outer bushings 54 associated with the second coupling elements 52 can be supported. The thread-reinforced joint mechanisms 16 and 20 are thus wedged between the support lug 68 on the flange arms $12_1$ and $14_1$ and the screw heads of the screws 22, 26 and/or the washers 70 associated with the screw heads.

The first coupling elements 50 serve to connect the thread-reinforced joint mechanisms 16 and 20 to the connection assembly 18. As mentioned previously, the first coupling elements 50 have an internal thread for this purpose into which the screws 24 and 30 can be screwed. The two parts 34 and 36 of the connection assembly each have four arms, of which only the arms $34_1$ and $34_2$ as well as $36_1$ and $36_2$ are shown. As can be seen in FIG. 4, the arms $34_1$ and $36_1$ have a recess 72 in which the screw head of the screws 24 and 30 are received. The arms $34_1$ and $36_1$ rest against the portion 64 of the first coupling elements 50. The portion 63 has a specified screw head.

In order to connect the connection assembly 18 to the thread-reinforced joint mechanisms 16 and 20, the screws 24 and 30 are screwed into the internal thread of the first coupling elements 50. During the screwing-in of the screws 24 and 30, the first coupling elements 50 are counter-held by means of the portion 64 with the screw head on which a wrench is placed. This prevents the torque required for screwing is transmitted via the coupling elements 50 to the outer bushings 54 and the elastic member 62. This may cause damage to the thread-reinforced joint mechanisms 16 and 18.

The securing members 32 are screwed into the internal thread of the first coupling elements 50 at the end of the first coupling elements 50 opposite the portion 64. Washers 70 are also provided on the securing members 32 on which the first coupling elements 50 and the outer bushings 54 can be supported. The securing members 32 prevent the first coupling elements 50 from being pulled out of the outer bushings 54 when tightening the screws 24 and 30. In addition, the securing members 32 prevent the elastic joint member 16, 18 from coming loose from the first coupling elements 50 during operation of the coupling device 10.

The securing members 32 are connected to the first coupling elements 50 directly during the manufacture of the thread-reinforced joint mechanisms 16 and 20. The securing members 32 are thus already provided on the thread-reinforced joint mechanisms 16 and 20 when the thread-reinforced joint mechanisms 16 and 20 are attached to the respective flange 12 or 14.

The two parts 34 and 46 of the connection assembly are connected to one another by the teeth 38 and 40 as well as by fastening means 74. The fastening means 74 can be screws and extend through corresponding openings in the two parts 34 and 36 of the connection assembly 18.

Figure 5:
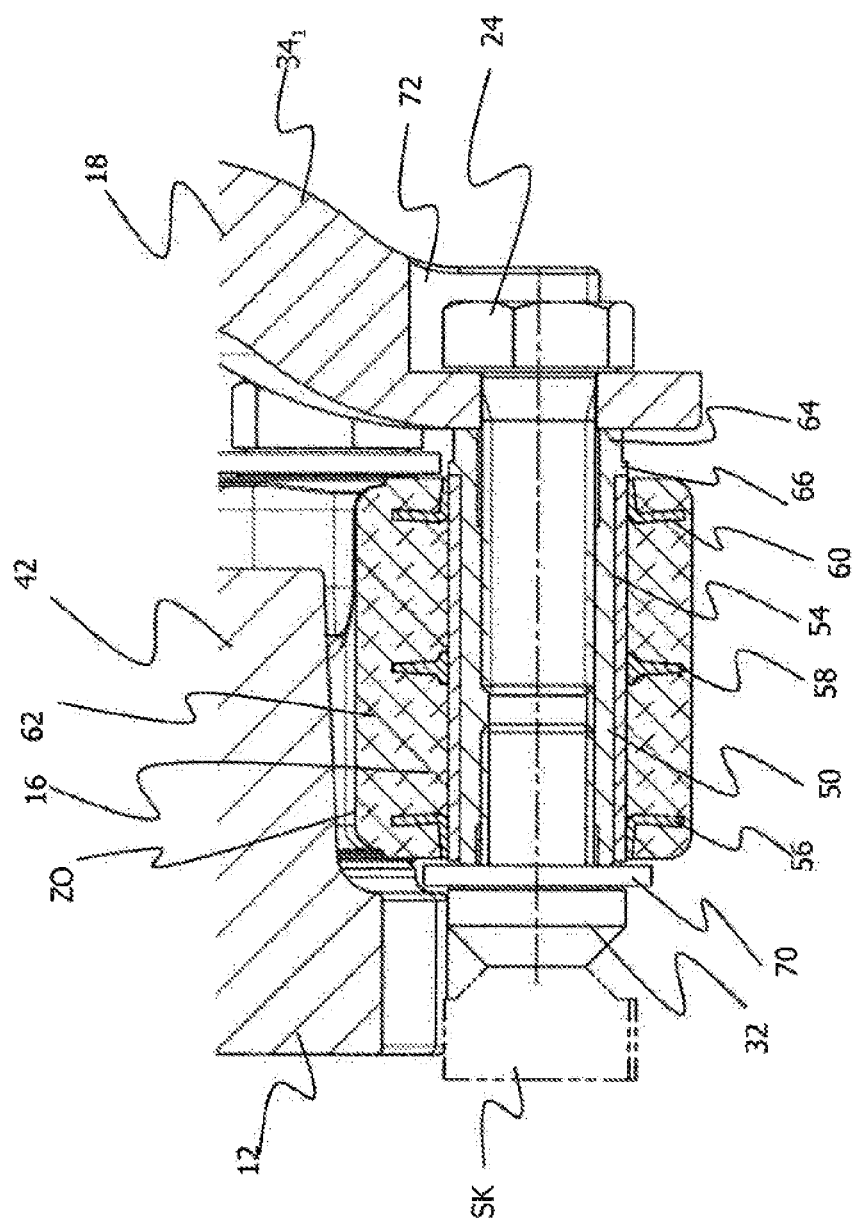
FIG. 5 shows a detailed view of the sectional view according to FIG. 5.

FIG. 5 shows an enlarged detailed view of the sectional view according to FIG. 4.

The detailed view according to FIG. 5 shows a portion of the first flange 12, the first thread-reinforced joint mechanism 16, and a portion of the arm $34_1$ of the part 34 of the connection assembly 18. The arm $34_1$ has a recess 72 in which the screw 24 is received. The screw 24 is screwed to the first coupling element 50 and/or the internal thread thereof. The arm $34_1$ is wedged between the portion 24 with the specified screw head and the head of the screw 24.

Furthermore, the securing member 32, which can be a breakaway screw, is screwed into the first coupling element 50. In FIG. 5, the screwable head SK is shown with a dotdashed line. The securing member 32 is screwed into the internal thread of the first coupling element 50, and at a certain torque, the screwable head SK breaks away from the rest of the securing member 32. After the breaking-off of the screwable head SK, the securing member 32 can no longer be loosened, or only with great effort. The securing member 32 embodied in this way is intended to prevent the securing member 32 from be loosened wrongly or unintentionally. The outer bushing 54 is wedged between the washer 70 arranged on the securing member 32 and a radial supporting projection 55 of the first coupling element 55. The collar elements 56, 58 and 60, which form a support means for the thread packages (not shown in FIG. 5), are provided on the outer bushing 54. The axially outside collar elements 56 and 60 are L-shaped and have a tube section that rests against the outer bushing 54 and is connected to a radial portion. The collar elements 58 are disc-shaped and rest with their thickened radially inner end against the outer bushings 54.

The tube section 42 of the first flange 12 extends into a central opening ZO of the thread-reinforced joint mechanism 16.

Figure 6:
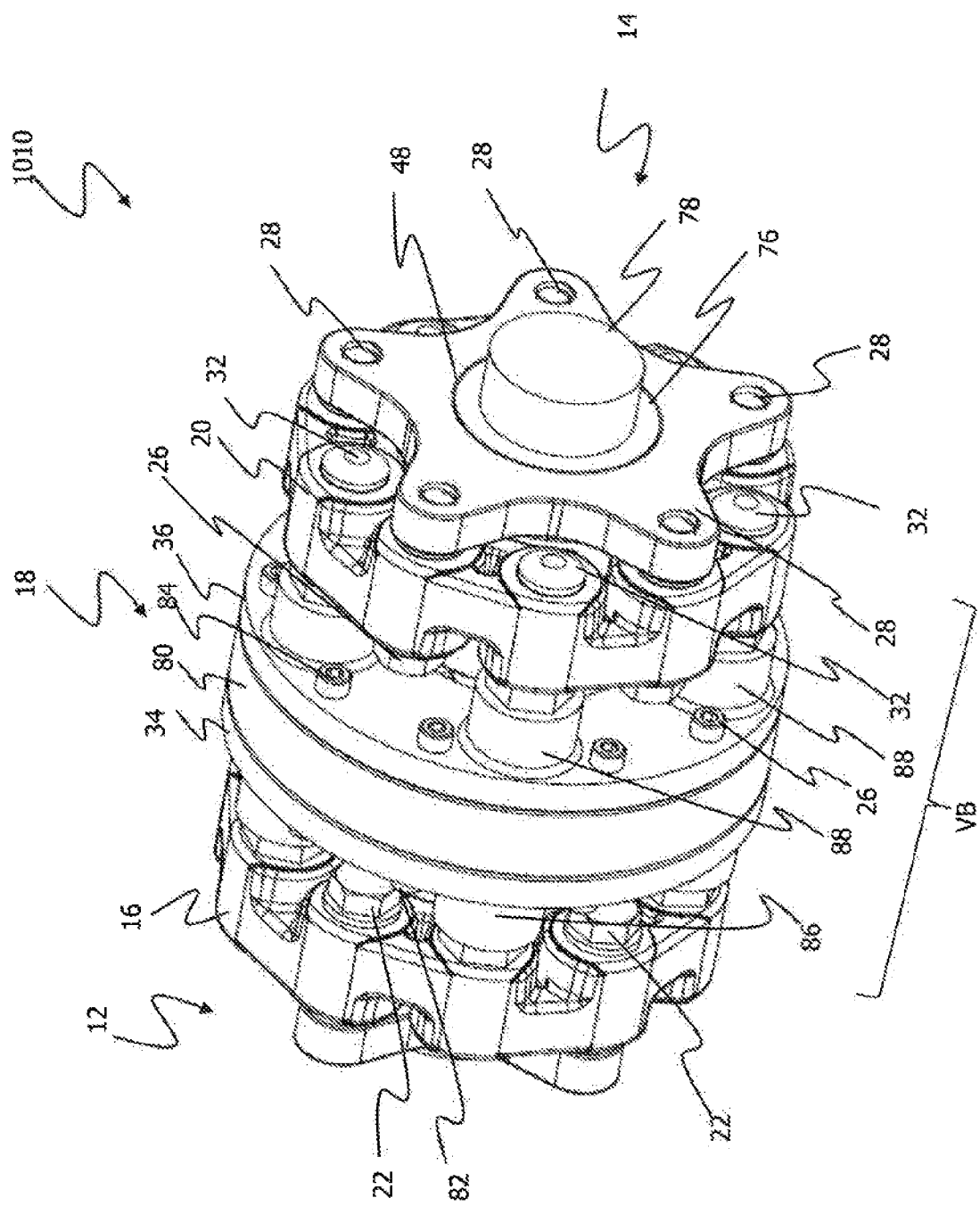
FIG. 6 shows a perspective view of a coupling device according to a second embodiment of the invention.

FIG. 6 shows a perspective view of a coupling device 1010 according to a second embodiment of the invention.

The coupling device 1010 comprises a first flange 12, a second flange 14, a first thread-reinforced joint mechanism 16, a connection assembly 18, and a second thread-reinforced joint mechanism 20.

The second flange 14 has a central opening 48. A connecting piece 76 is received in this central opening. The connecting piece 76 is formed on a shaft 78, which can be a motor output shaft or a transmission input shaft. The connecting piece 76 thus forms a portion either of the motor output shaft or of the transmission input shaft. In this exemplary embodiment, the shaft 78 is the transmission input shaft.

The first thread-reinforced joint mechanism 16 is connected by fastening means in the form of screws 22 to the first flange 12. The second thread-reinforced joint mechanism 20 is connected by fastening means in the form of screws 26 to the second flange 14. The second flange 14 has openings 28 into which the screws 26 extend. Securing members 32 are provided on the thread-reinforced joint mechanisms 16 and 20.

The connection assembly 18 has a first part 34 and a second part 36. The first part 34 is associated with the first thread-reinforced joint mechanism 16. The first part 36 is associated with the second thread-reinforced joint mechanism 20. An intermediate member 80 is provided between the first part 34 and the second part 36. The first part 34 is connected by means of the screws. The second part 36 is screwed by means of the screws 84 to the intermediate member 80. The screws 82 and 84 extend in the axial direction into the intermediate member.

The first part 34 has projections 86 that extend in the direction of the first thread-reinforced joint mechanism 16. The second part 36 has in like manner projections 88 that extend in the direction of the second thread-reinforced joint mechanism 20. In FIG. 6, fastening means (not shown) for connecting the parts 34 and 36 to the respective thread-reinforced joint mechanism 16, 20 extend through the projections 86 and 88.

Figure 7:
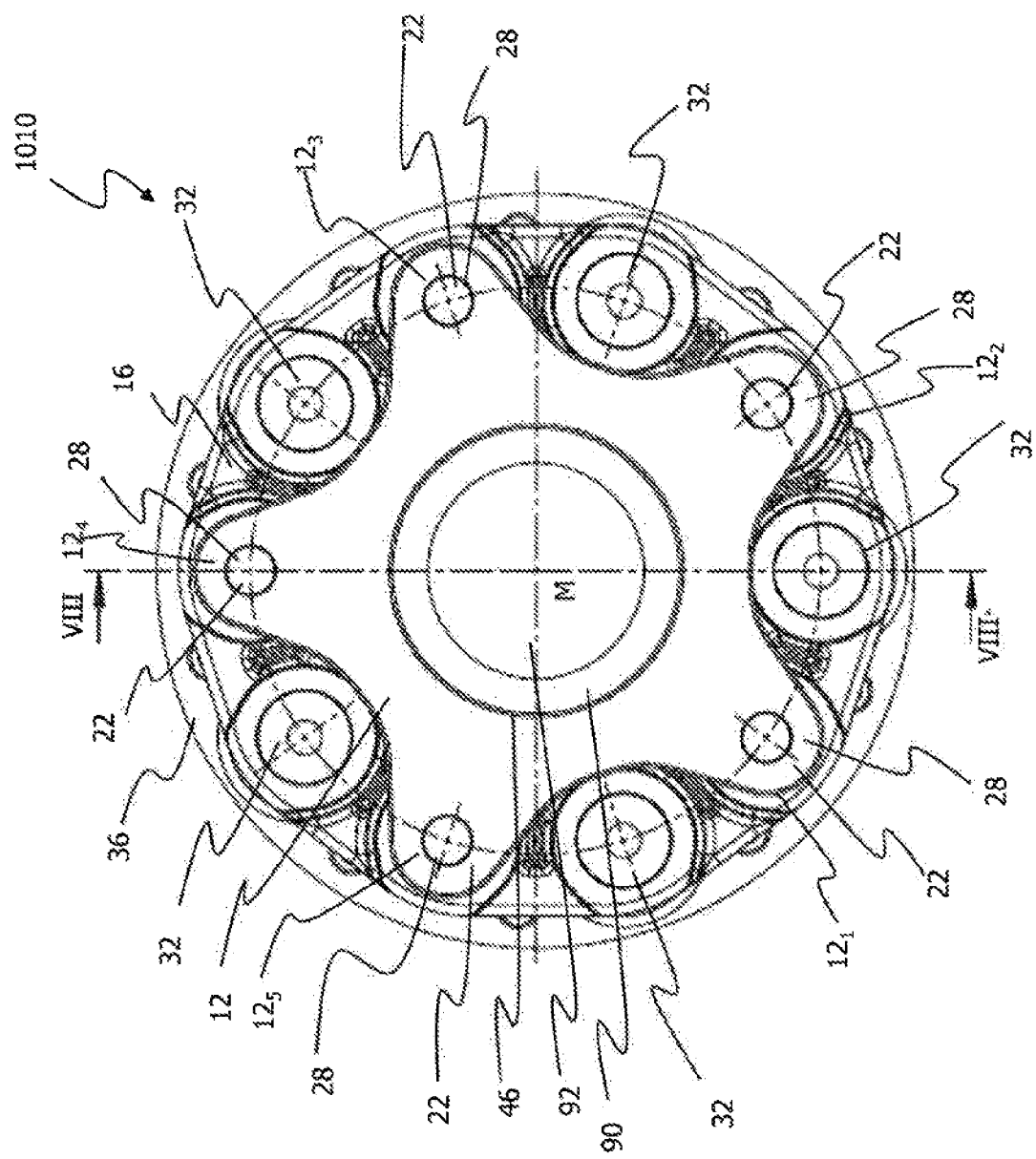
FIG. 7 shows a front view of a coupling device according to the second embodiment.

FIG. 7 shows a front view of the coupling device 1010 in which the first flange 12, the first thread-reinforced joint mechanism 16, and the first part 34 can be seen. The first flange 12 comprises five fastening projections $12_1$ to $12_5$.

Openings 28 are formed in these fastening projections $12_1$ to $12_5$ into which the screws 22 are screwed. The screws 22 connect the first thread-reinforced joint mechanism 16 to the flange 12. The securing members 32 can be seen on the thread-reinforced joint mechanism 16. A connecting piece 90 is also included at the central opening 46 of the first flange 12. The connecting piece 90 is formed on a shaft 92, which can be the motor output shaft or a transmission input shaft. According to this exemplary embodiment, the shaft 92 is the motor output shaft.

Even if the connecting pieces 76 and 90 are shown differently in the individual embodiments, the connecting pieces 76 and 90 are part of the shafts 78 or 92 in all embodiments.

Figure 8:
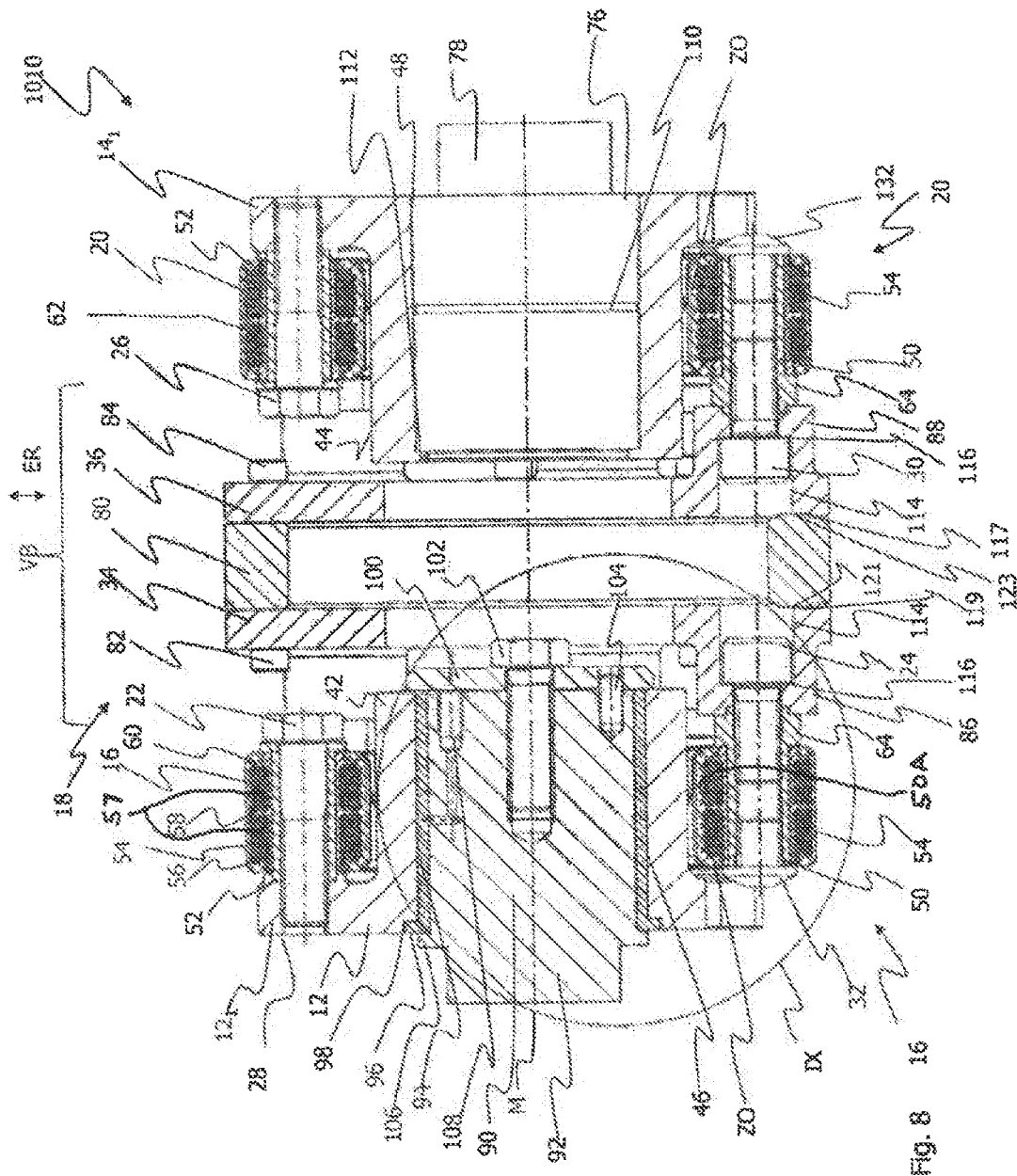
FIG. 8 shows a sectional view of a coupling device according to the second embodiment.

FIG. 8 shows a sectional view of the coupling device along the sectional line VIII-VIII in FIG. 7.

The first flange 12 and the second flange 14 each have a tubular portion 42, 44 that extends respectively through a central opening ZO of the thread-reinforced joint mechanisms 16 and 20. The central opening 46 and 48 extends through the tubular portions 42 and 44. 76 and 90 are received in the central opening 46 and 48. A bushing 94 is provided between the opening 46 in the first flange 12 and the connecting piece 90. The bushing 94 has a collar 96 that is received in a recess 98 on the side of the flange 12 facing away from the thread-reinforced joint mechanism 16. The bushing 94 rests with its end opposite the collar 96 against a radially extending securing means 100. The securing means 100 can be disc-shaped or annular. The securing means 100 is screwed by means of the screw 102 to the connecting piece 90. The connecting piece 90 has an opening in which a positioning pin 104 is received. The positioning pin 104 extends at least partially into an opening in the securing means 100. The positioning pin 104 serves to prevent relative torsion between the securing means 100 and the connecting piece 94. What is more, the positioning pin 104 serves to position and align the securing means 100 in order to prevent imbalances, for example.

The connecting piece 90 has a projection 106 extending in the radial direction that rests against the collar 96 of the bushing 94. The radial projection 106 is used to secure the bushing 96 in the axial direction. A recess 107, which indicates the transition of the connecting piece 90 to the shaft 92 is adjacent to the radial projection 106 in the axial direction. The connecting piece 90 has a borehole or opening 108 to which an oil pressure can be applied. By means of the oil pressure applied to the borehole 108, the bushing 94 can be pressed away from the connecting piece 90 after the securing means 100 has been removed from the connecting piece 90.

The connecting piece 76 is shown in the uncut state in FIG. 8. The connecting piece 76 has boreholes (not shown) that correspond to the borehole 108 of the connecting piece 90. These boreholes of the connecting piece 76 cooperate with the groove 110 on the outer periphery of the connecting piece 76 and serve to press the flange 14 away from the connecting piece 76. On the inner end of the central opening 48 in the axial direction, the flange 14 has an inwardly oriented projection 112 that serves as a stop when the flange 14 is pushed onto the connecting piece 76 in order to ensure the correct positioning of the flange 14 on the connecting piece.

The thread-reinforced joint mechanisms 16 and 20 have first coupling elements 50 and second coupling elements 52 that are housed in outer bushings 54. Collar elements 56, 58 and 60 are respectively provided on the outer bushings 54. The collar elements 58 and 60 are integrally formed with the outer bushing 54. The collar element 56 is pressed up onto the outer bushing 54. In FIG. 8, thread packages 57 are visible between the collar elements 56, 58 and 60 that interconnect the coupling elements 50 and 52 and the outer bushings 54 mounted on same.

The first coupling elements 50 are tubular and have an internal thread 50A. A specified screw head, which can be hexagonal, for example, is provided on the first coupling elements 50, more particularly the end portion 64 thereof. Any other screw head or contour is also conceivable, however. The projection 86 of the first part 34 of the connection assembly 18 rests against the end portion 64. The same applies to the projection 88 of the second part 36, which also rests against the end portion 64 of the first coupling element 50. The projections 86 and 88 have a stepped opening 114 in Which the screws 24 and 30 are received with their screw head. The screw head of the screws 24 and 30 rests against an offset 116 in the opening 114. The ledge 116 constricts the diameter of the opening 114. The screw heads of the screws 24 and 40 can be countersunk completely into the openings 114 in the projections 86 and 88. Once the screws 24 and 30 are tightened, the screws 24 and 30 rest with their screw head against the ledge 116.

The intermediate member 80 can be seen between the first part 34 and the second part 36 of the connection assembly 18. The intermediate member 80 is annular and connected by means of the screws 82 and 84 to the first part 34 and the second part 36.

The coupling device 1010 is disassembled as follows:

First, the screws 84 and 86 are loosened in order to enable the intermediate member 80 to be removed in the radial direction in the direction of the double arrow ER.

After the radial removal of the intermediate member 80, the screws 24 of the first part 34 are loosened. The screws 24 are counter-held by means of the portion 64 using a hexagonal head, for example. Various other screw heads and contours are conceivable that are suitable for counter-holding. The first part 34 can then be moved axially inward and then radially outward in the direction of the double arrow ER.

The screws 30 are then counter-held and loosened by means of the portion 64 using a hexagonal head, for example, the second part 36 is moved axially inward toward the first thread-reinforced joint mechanism 16, and the second part 36 is removed in the radial direction.

The screws 22 or 26 can then be loosened successively in order to first remove one of the thread-reinforced joint mechanisms 16 or 20 inwardly in the axial direction, followed by the other remaining thread-reinforced joint mechanism 16 or 20. The thread-reinforced joint mechanisms 16 and 20 can be removed in the radial direction as soon as the respective thread-reinforced joint mechanism 16 or 20 has been moved completely over the end of the tube section 42 or 44.

Assembly is done as follows:

First, the thread-reinforced joint mechanism 16 is inserted radially and moved along the tubular portion 42 to its point of attachment. The thread-reinforced joint mechanism 16 is then screwed by means of the screws 22 to the first flange 12. The screws 22 are counter-held by means of the portion 64 using a hexagonal head, for example. In like manner, the thread-reinforced joint mechanism 20 is connected to the second flange 14 after the radial insertion thereof.

The first part 34 of the connection assembly 18 is inserted radially and caused to abut with the end portion 64 of the coupling elements 50 of the thread-reinforced joint mechanism 16. The first part 34 is then screwed by means of the screws 24 to the fiber-reinforced joint mechanism 16. The screws 24 are secured by means of the portion 64 using a hexagonal head, for example. In the same way, the second part 34 is inserted in the radial direction and connected to the thread-reinforced joint mechanism 20.

In the axial free space now formed between the axial surfaces of the parts 34 and 36 facing away from the thread-reinforced joint mechanisms 16 and 18, the center part 80 is introduced. The center part 80 is then connected by means of the screws 82 and 84 to the first part and the second part.

As can be seen particularly from FIG. 8 and the above description of the disassembly and assembly of the coupling device 1010, all of the components of the coupling device can be connected to or detached from one another from the connection area VB.

Positioning means 117, 119, 121, 123 are provided in FIG. 8 on the axial surfaces of the intermediate member 80. The positioning means are formed by projections 117, 119 that protrude in the axial direction and recesses 121, 123 in which the projections 117, 119 engage. The projections 117 and 119 engage in a recess 121 in the first part 34 and a recess 123 in the second part 36. The projections 117, 119 and the recesses 121, 123 serve to position the center part 80 during the radial introduction of the center part 80 on the first part 34 and the second part 36. In this way, imbalances due to imprecise or incorrect positioning of the center part 80 can be prevented or reduced.

Figure 9:
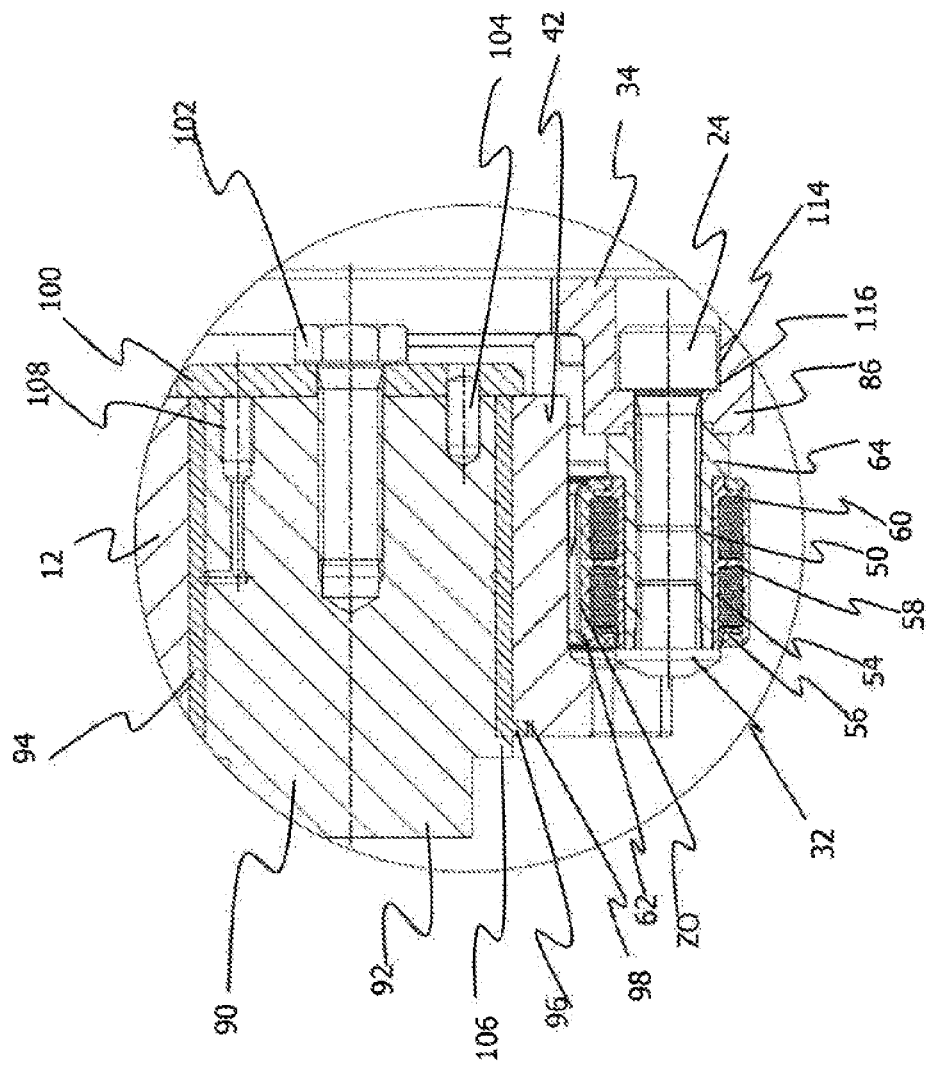
FIG. 9 shows a detailed view of a portion of the sectional view according to FIG. 8.

FIG. 9 shows a detailed view of the detail X in FIG. 8.

In FIG. 9, the projection 86 can be seen on the second part 34, which also rests against the end portion 64 of the first coupling element 50. The screw 24 for connecting to the thread-reinforced joint mechanism 16 or for connecting to the internal thread in the first coupling element 50 extends through the opening 114 of the projection 86.

The tube portion 42 of the first flange 12 extends through the central opening ZO of the thread-reinforced joint mechanism 16. The connecting piece 90 is received in the opening 46 of the first flange 12. The bushing 94 is provided between the flange 12 and the connecting piece 90 and can act as a slip clutch. The flange 12 is secured by means of the securing means 100 to the connecting piece 90.

In addition, it can be clearly seen in FIG. 9 that the thread-reinforced joint mechanism 16 is formed by a joint member with a one-piece elastic casing 62 in which the collar elements 56, 58, 60 as well as the second coupling element 54 are received at least at a distance.

Figure 10:
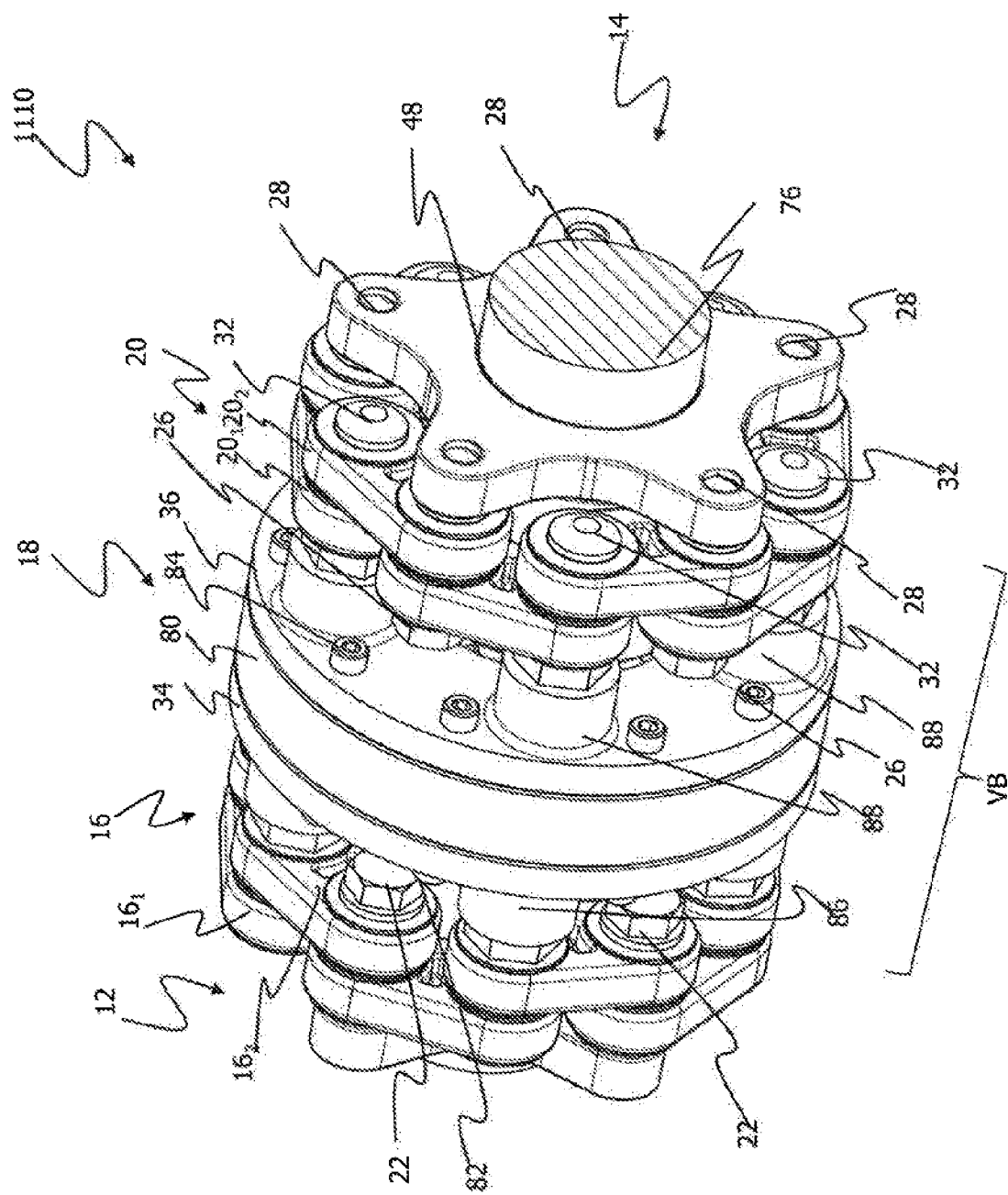
FIG. 10 shows a perspective view of a coupling device according to a third embodiment of the invention.

FIG. 10 shows a perspective view of a coupling device 1110 according to a third embodiment of the invention.

The essential difference between the second embodiment described with reference to FIGS. 6 to 9 and the third embodiment shown in FIGS. 10 to 13 lies in the thread-reinforced joint mechanisms 16 and 20.

The thread-reinforced joint mechanisms 16 and 20 according to this embodiment are formed by a large number of coupling lugs $16_1$, $16_2$ and $20_1$ and $20_2$. The coupling lugs $16_1$, $16_2$ and $20_1$ and $20_2$ are each offset in the axial direction in relation to one another.

Figure 11:
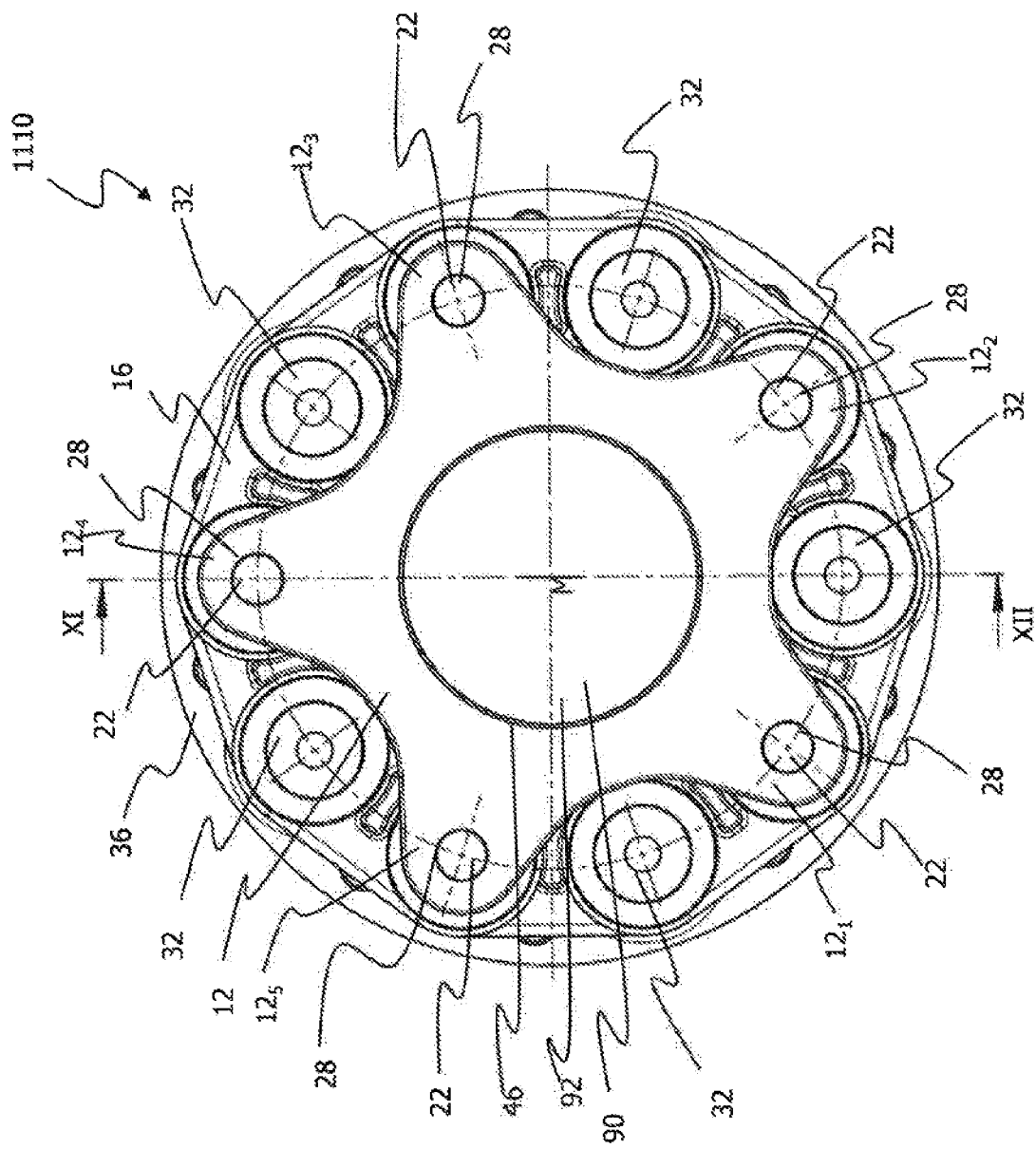
FIG. 11 shows a front view of a coupling device according to the third embodiment.

Fig. 11 shows a top view of a coupling device 1010.

Figure 12:
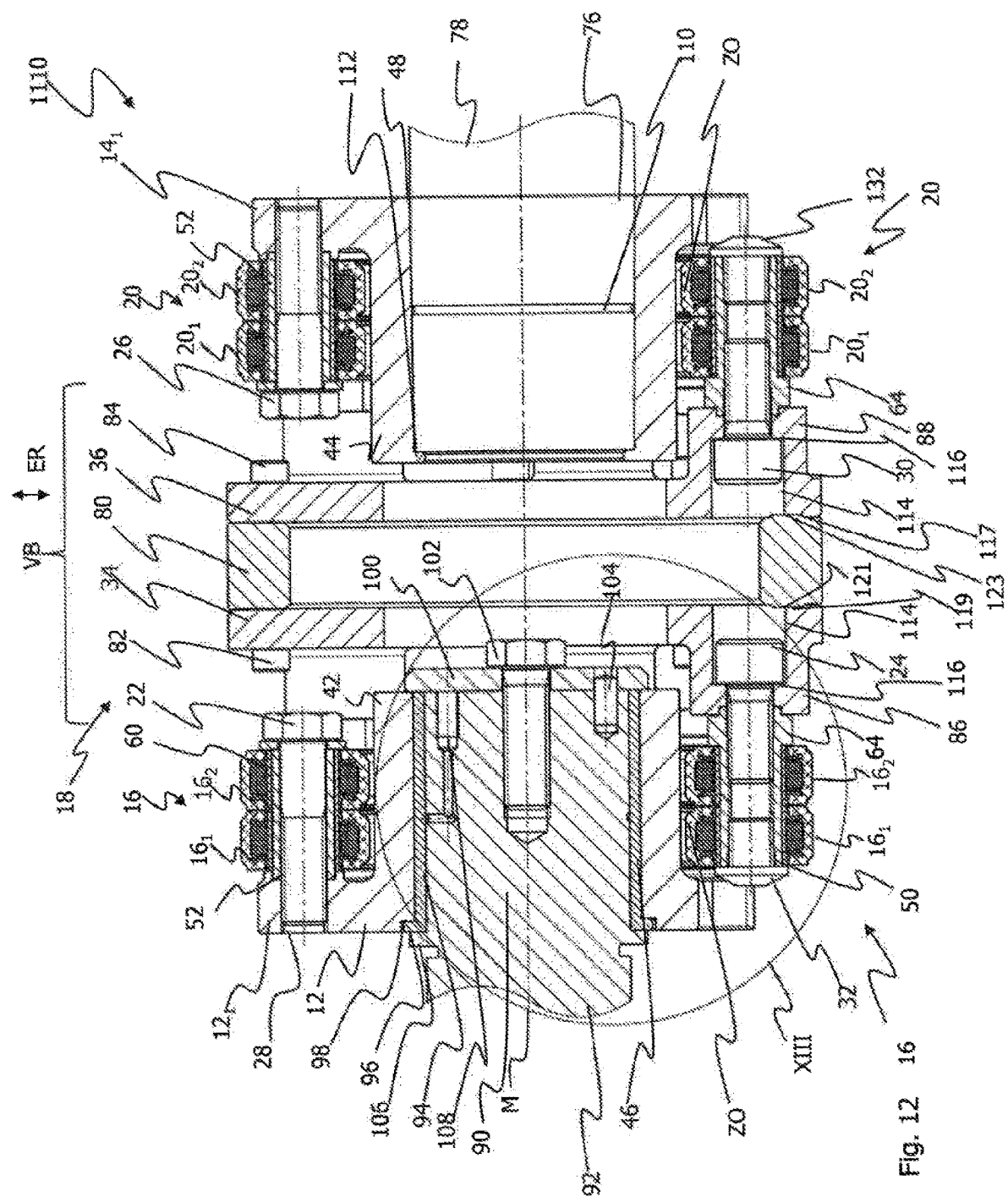
FIG. 12 shows a sectional view of a coupling device according to the third embodiment.

FIG. 12 shows a sectional view along the sectional line XII-XII in FIG. 11.

The coupling lugs $16_1$, $16_2$ and $20_1$, $20_2$ offset in relation to one another in the axial direction can be seen in FIG. 12. The coupling lugs $16_1$ and $16_2$ are screwed with one of their ends by means of the screws 22 to the flange 12. The same applies to the coupling lugs $20_1$, $20_2$, which are screwed by means of the screw 26 to the flange 14. The coupling lugs $16_1$, $16_2$ are screwed with one of their ends by means of the screws 24 to the first part 34. The coupling lugs $20_1$ and $20_2$ are screwed with one of their ends by means of the screws 30 to the second part 36. The coupling elements 50, 52 are pressed into the coupling lugs $16_1$ and $16_2$. In other words, the coupling lugs $16_1$, $16_2$ and $20_1$, $20_2$ each have two points of attachment, one of which is connected to the flange and the respective other one is connected to the corresponding part 34 or 36.

Figure 13:
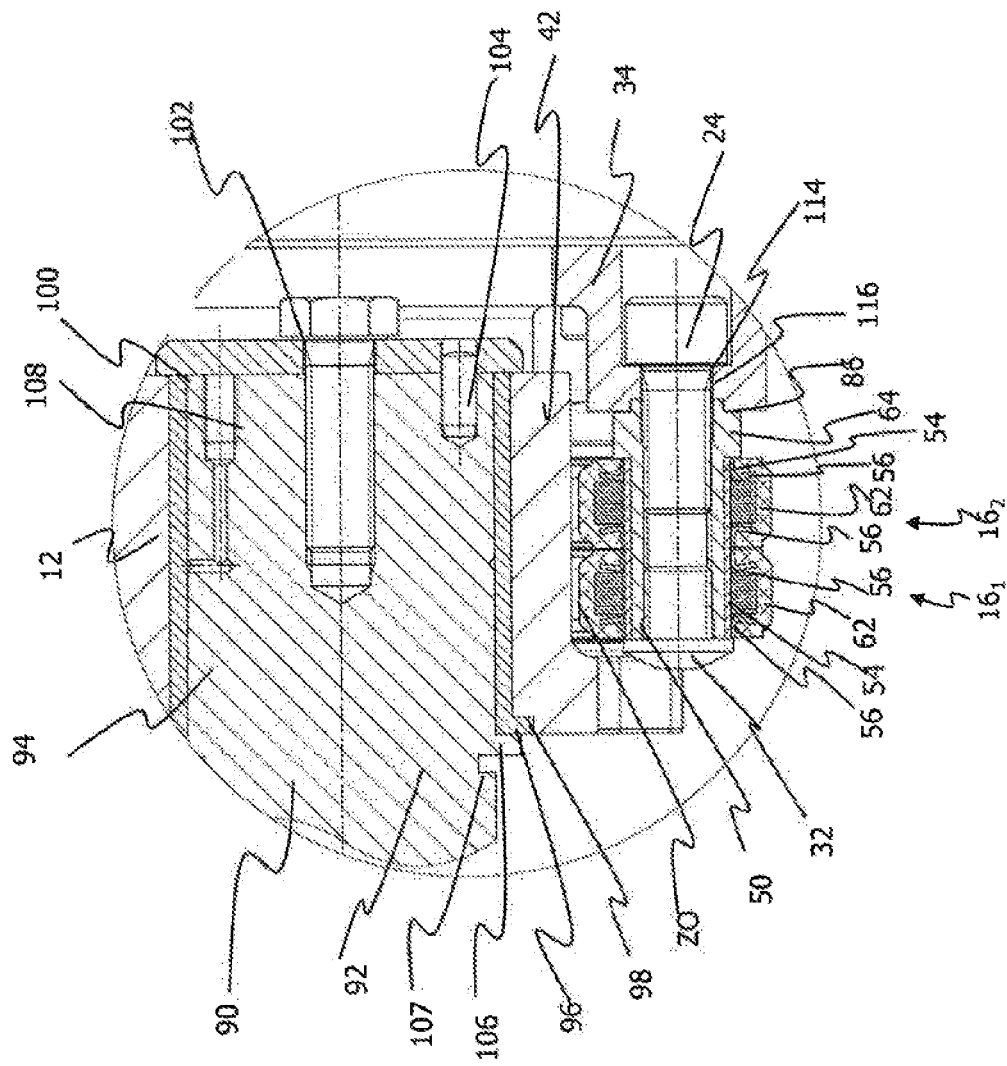
FIG. 13 shows a detailed view of a portion of the sectional view according to FIG. 12.
Figure 14:
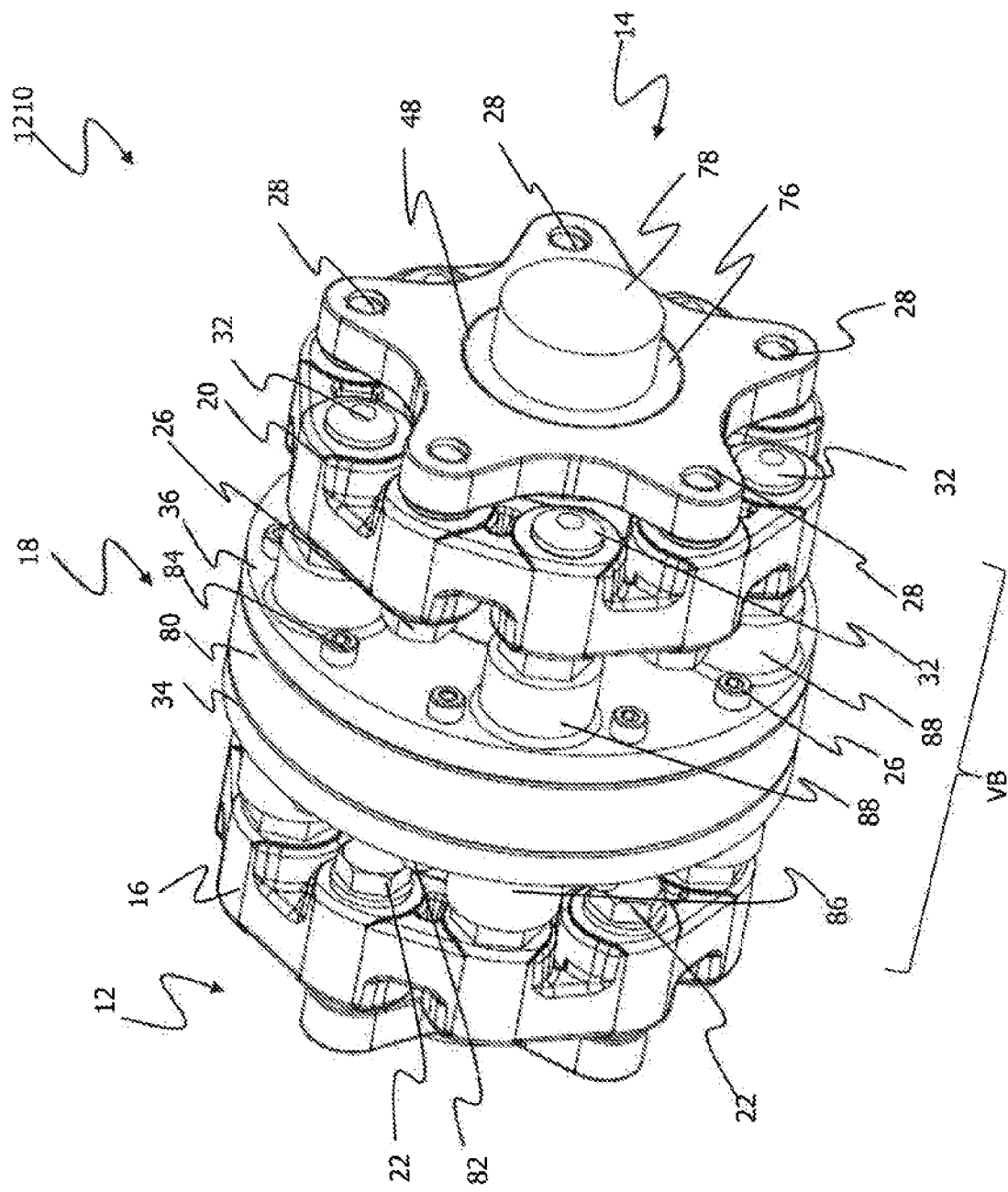
FIG. 14 shows a perspective view of a coupling device according to a fourth embodiment of the invention.
Figure 15:
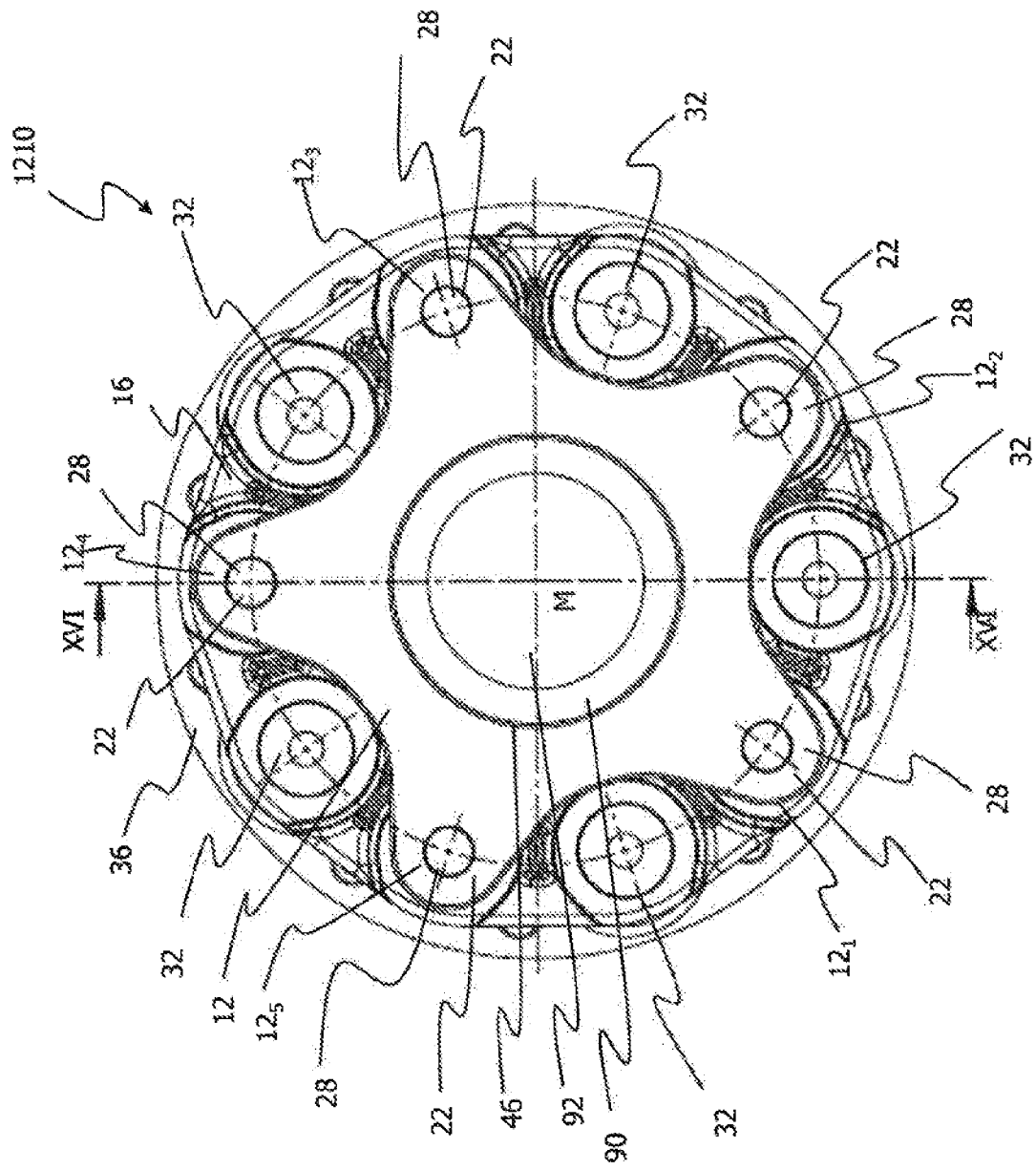
FIG. 15 shows a front view of a coupling device according to the fourth embodiment.

It can be seen in FIG. 13 that each of the coupling lugs $16_1$ and $16_2$ has an elastic member 62 in which the outer bushings 54, the collar elements 56, and the thread package arranged in the axial direction between the two collar elements 56 are received at least partially. The coupling element 50 is pressed into the coupling lugs $16_1$ and $16_2$.

The fourth embodiment illustrated in FIGS. 14 to 17 corresponds for the most part to the second embodiment described above with reference to FIGS. 6 to 9.

Figure 16:
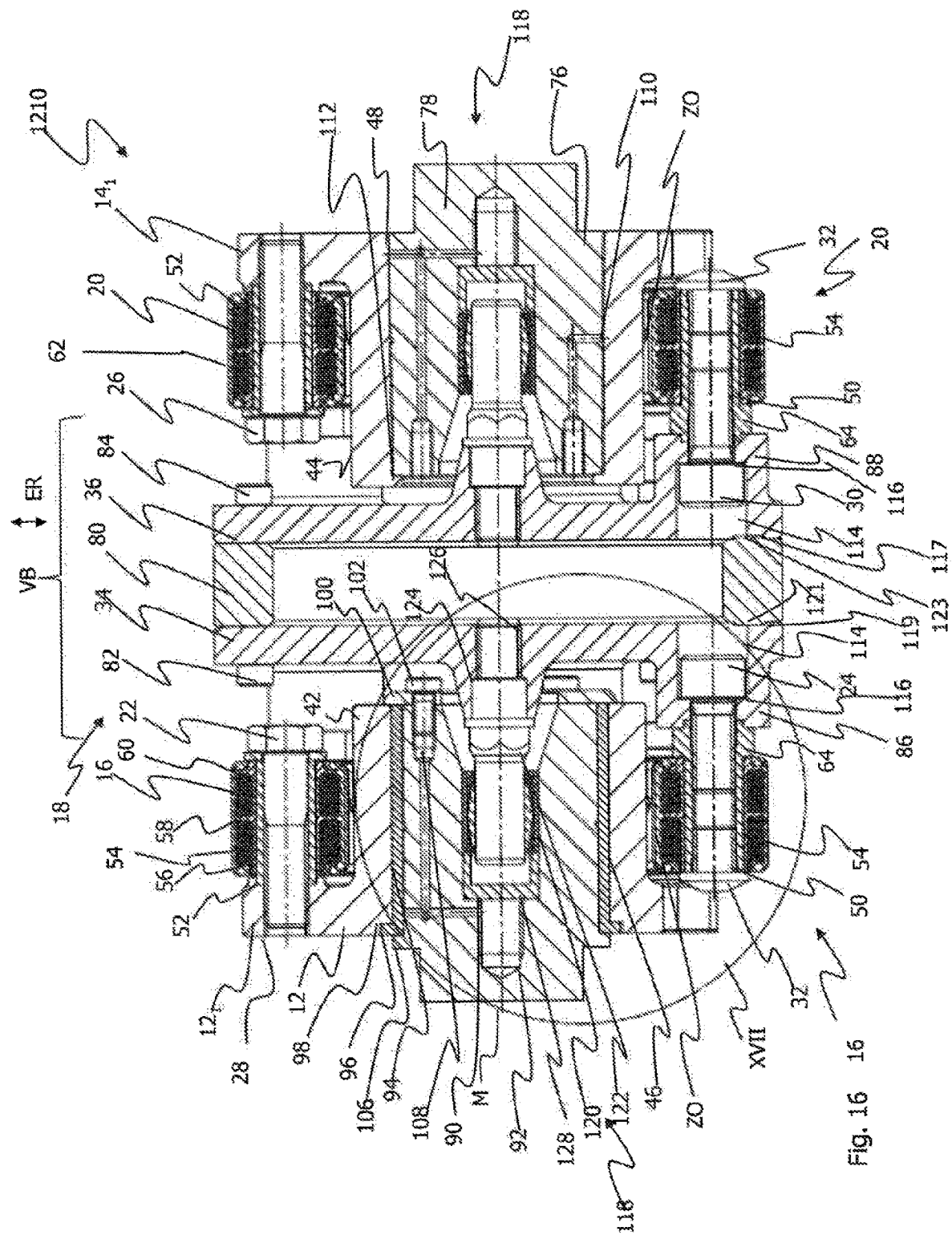
FIG. 16 shows a sectional view of a coupling device according to the fourth embodiment.
Figure 17:
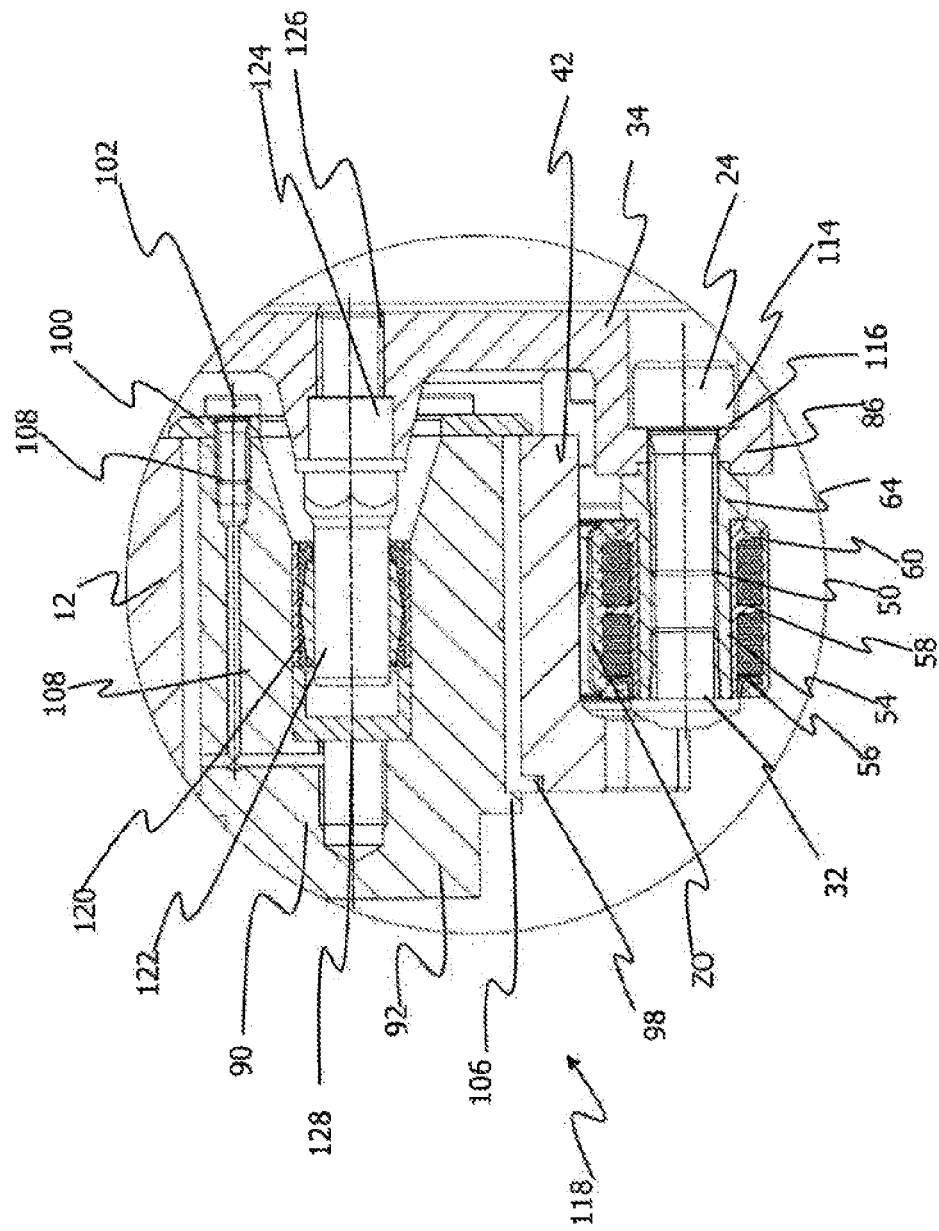
FIG. 17 shows a detailed view of a portion of the sectional view according to FIG. 16.
Figure 18:
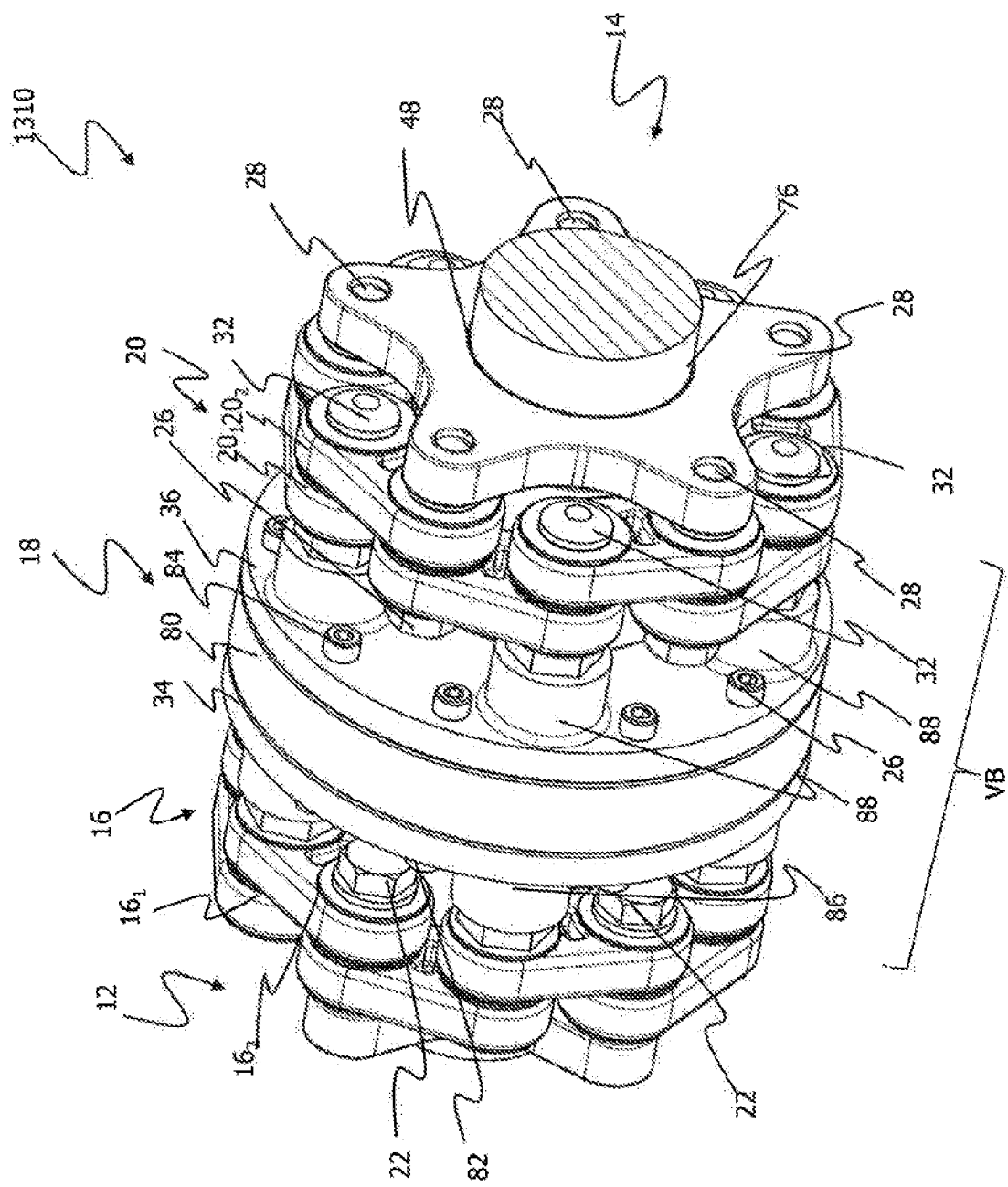
FIG. 18 shows a perspective view of a coupling device according to a fifth embodiment of the invention.
Figure 19:
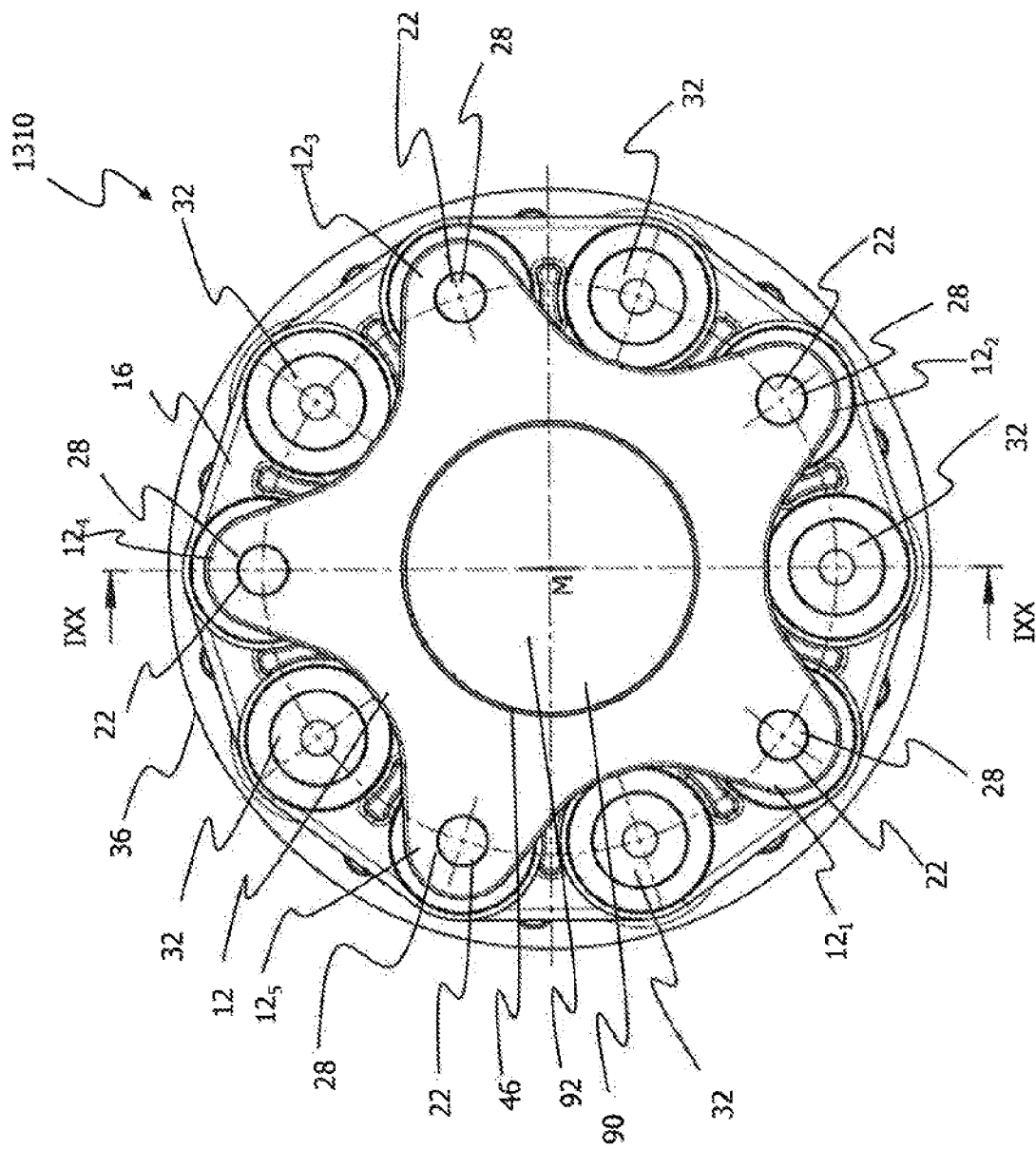
FIG. 19 shows a front view of a coupling device according to the fifth embodiment.
Figure 20:
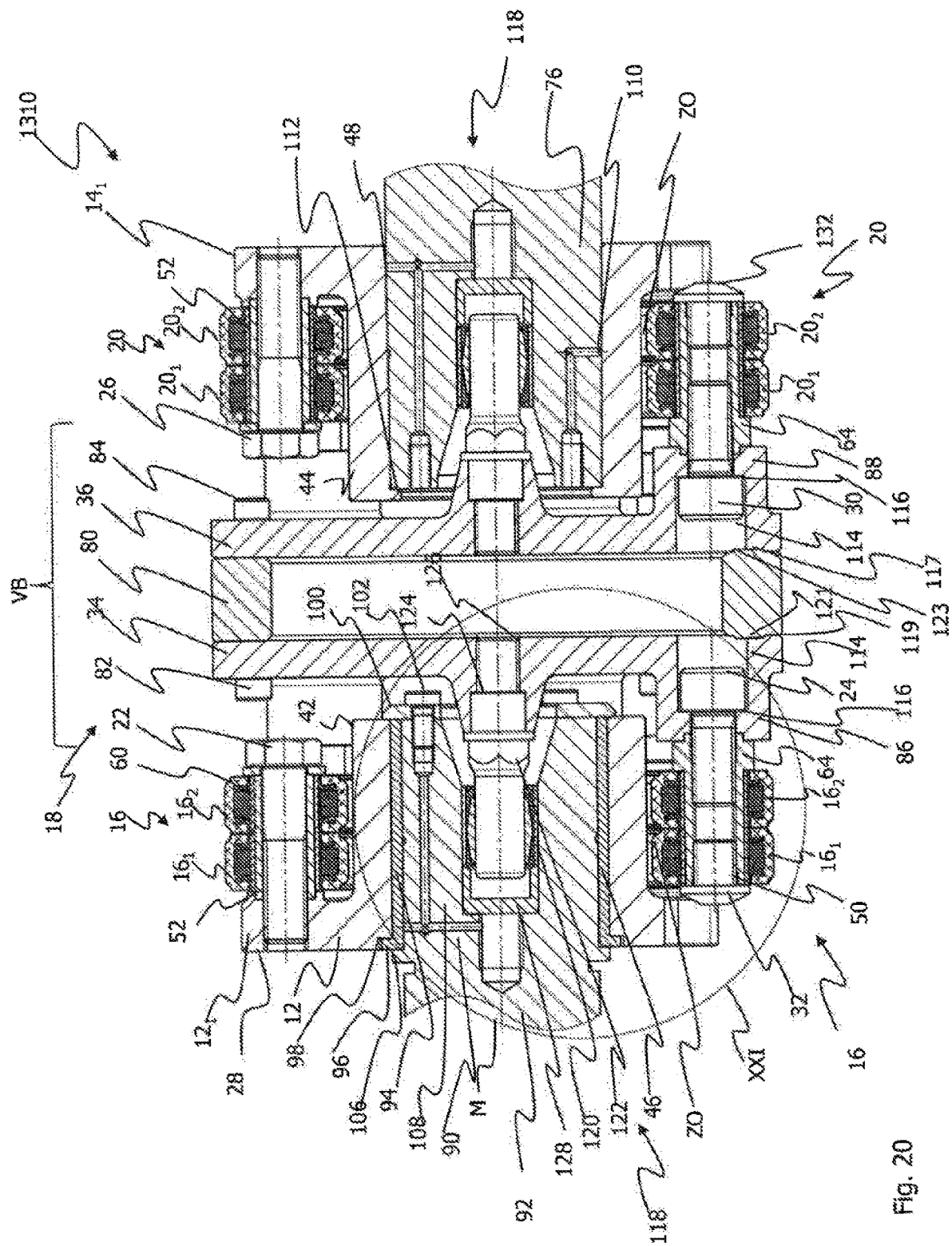
FIG. 20 shows a sectional view of a coupling device according to the fifth embodiment.
Figure 21:
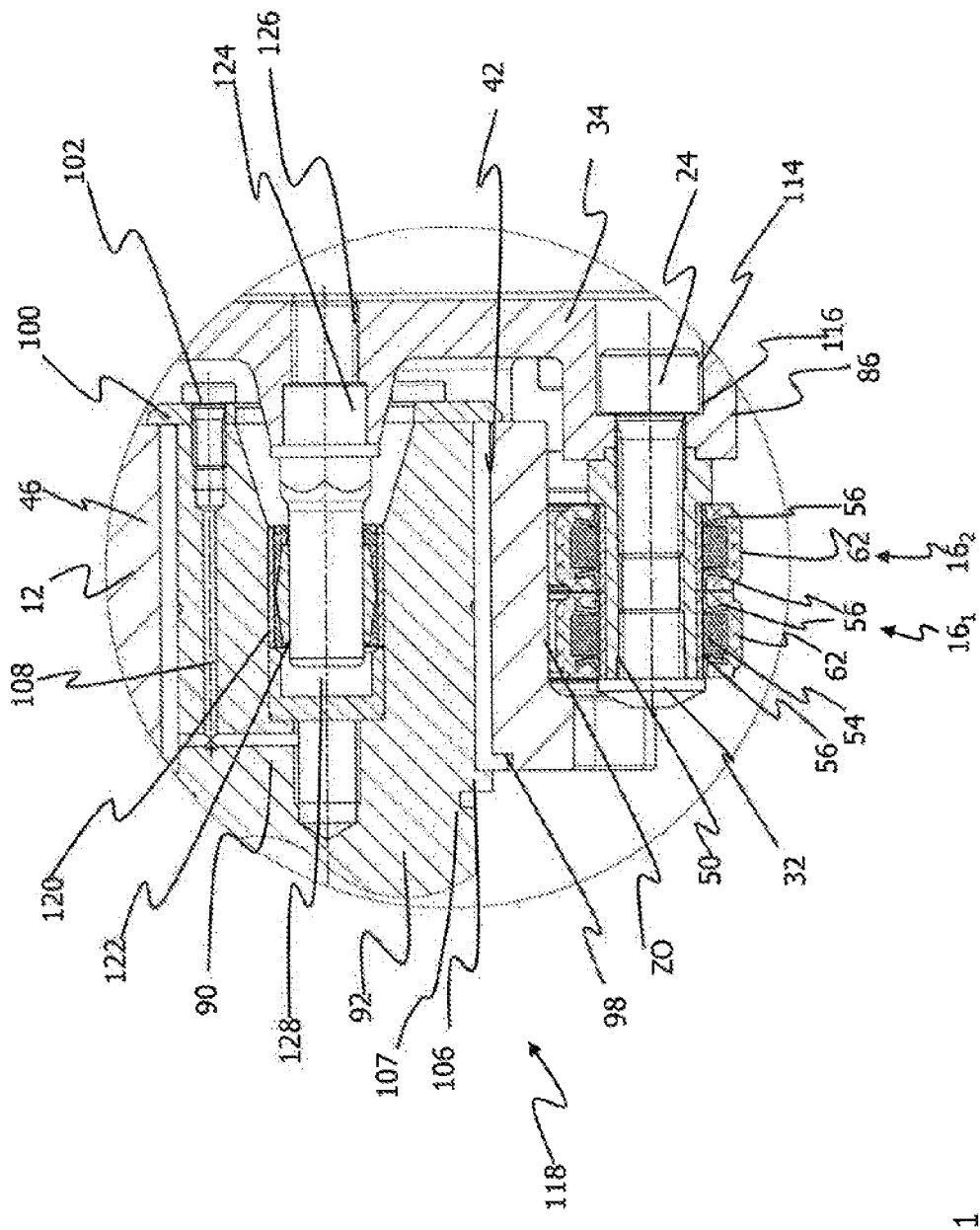
FIG. 21 shows a detailed view of a portion of the sectional view according to FIG. 20.

The essential difference between these two embodiments becomes clear in FIG. 16. The coupling device 1210 has centering devices 118 that are provided on the connecting pieces 90, 76 and the parts 34 and 36 of the connection assembly. The centering devices 118 have centering sleeves 120 that are provided in the connecting piece 90 and the connecting piece 76. In the following, the centering device 118 will be described in relation to the connecting piece 90 and the first part 34. The centering device 118 on the second part 36 and the connecting piece 76 is identical.

The centering sleeve 120 has an inner bushing and an outer bushing that are connected to one another by means of an elastic rubber layer. A centering bolt 122 is received in the inner bushing of the centering sleeve 120 that is connected to the first part 34. The centering bolt 122 has a threaded portion 124 that is screwed into a threaded opening 126 on the first part 34. The threaded opening 126 on the first part 34 extends through a projection that extends toward the connecting piece 90. The centering bolt 120 rests with a radially circumferential projection against this projection. Furthermore, a press-out sleeve 128 is provided to which an oil pressure can be applied via the borehole 108, which oil pressure serves to force the centering sleeve 120 out of the connecting piece 90. The centering sleeve 120 can be forced out of the connecting piece 90 by means of the oil pressure acting on the press-out sleeve 128.

The first flange 12 is secured axially by means of the securing means 100 together with the bushing 94 to the connecting piece 90. The connecting piece 90 is screwed by means of the screw 102 to the securing means 100.

The centering bolt 122 is received in the inner bushing of the centering sleeve 120 such that the centering bolt 122 is received with the first part 34 or with the connection assembly 18 relative to the connecting piece 90 with the flange 12 so as to be displaceable and also deflectable in the axial direction, i.e., in order to compensate for angular offsets.

The fifth embodiment shown in FIGS. 18 to 21 represents a combination of the third and fourth embodiments described above.

According to this embodiment, the thread-reinforced joint mechanisms 16 and 20 are formed by individual coupling lugs $16_1$, $16_2$ and $20_1$, $20_2$.

The coupling device 1310 has centering devices 118, which were described in detail above in relation to the fourth embodiment. In order to avoid repetitions, further detailed remarks regarding the centering devices 118 will be abstained from here.

Figure 22:
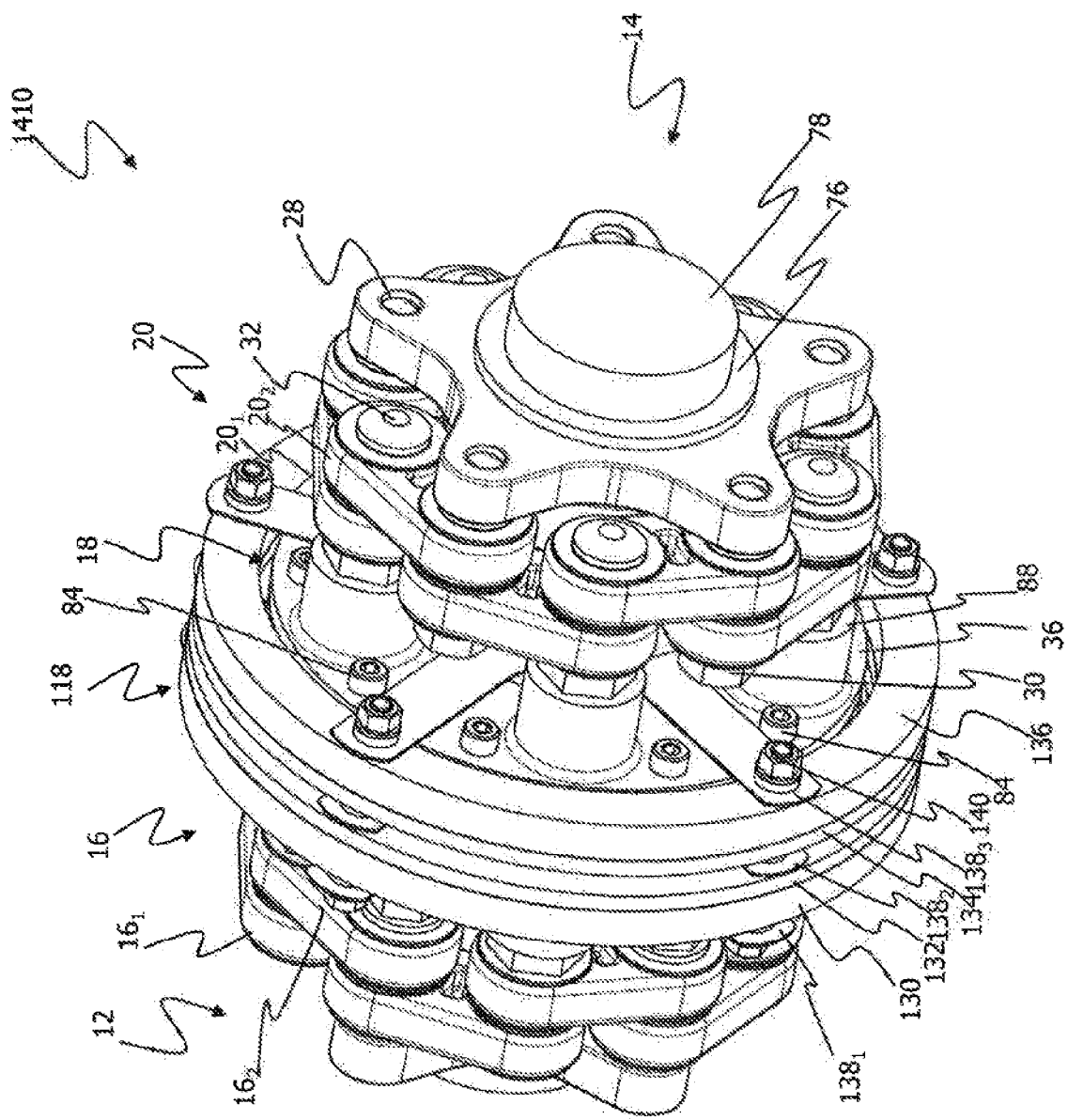
FIG. 22 shows a perspective view of a coupling device according to a sixth embodiment of the invention.

FIG. 22 shows a perspective view of a coupling device 1410 according to a sixth embodiment of the invention.

The coupling device 1410 has a first flange 12, a second flange 14, a first thread-reinforced joint mechanism 16, and a second thread-reinforced joint mechanism 20. The thread-reinforced joint mechanisms 16 and 20 are connected to one another by means of a connection assembly 18. According to this embodiment, the connection assembly 18 has a multi-part design. However, only the part 36 of the connection assembly 18 is visible in FIG. 22. The individual parts of the connection assembly 18 are interconnected by means of the screws 84, for example. The part 36 of the connection assembly 18 has projections 88 that are used for coupling with the thread-reinforced joint mechanism 20.

The coupling device 1410 also has a centering device 118. The centering device 119 has four annular elements 130, 132, 134 and 136.

Besides the annular elements 130, 132, 134 and 136, the centering device 118 has three joint diaphragms $138_1$, $138_2$ and $138_3$. The annular elements 130, 132, 134 and 136 as well as the joint diaphragms 138 are interconnected by screws 140. The joint diaphragms 138₁, 138₂ and 138₃ extend in a star shape between the annular elements 130, 132, 134 and 136 and a point of attachment in a central region of the coupling device 1410. The annular elements 130, 132, 134 and 136 extend radially outside around the connection assembly 18.

Figure 23:
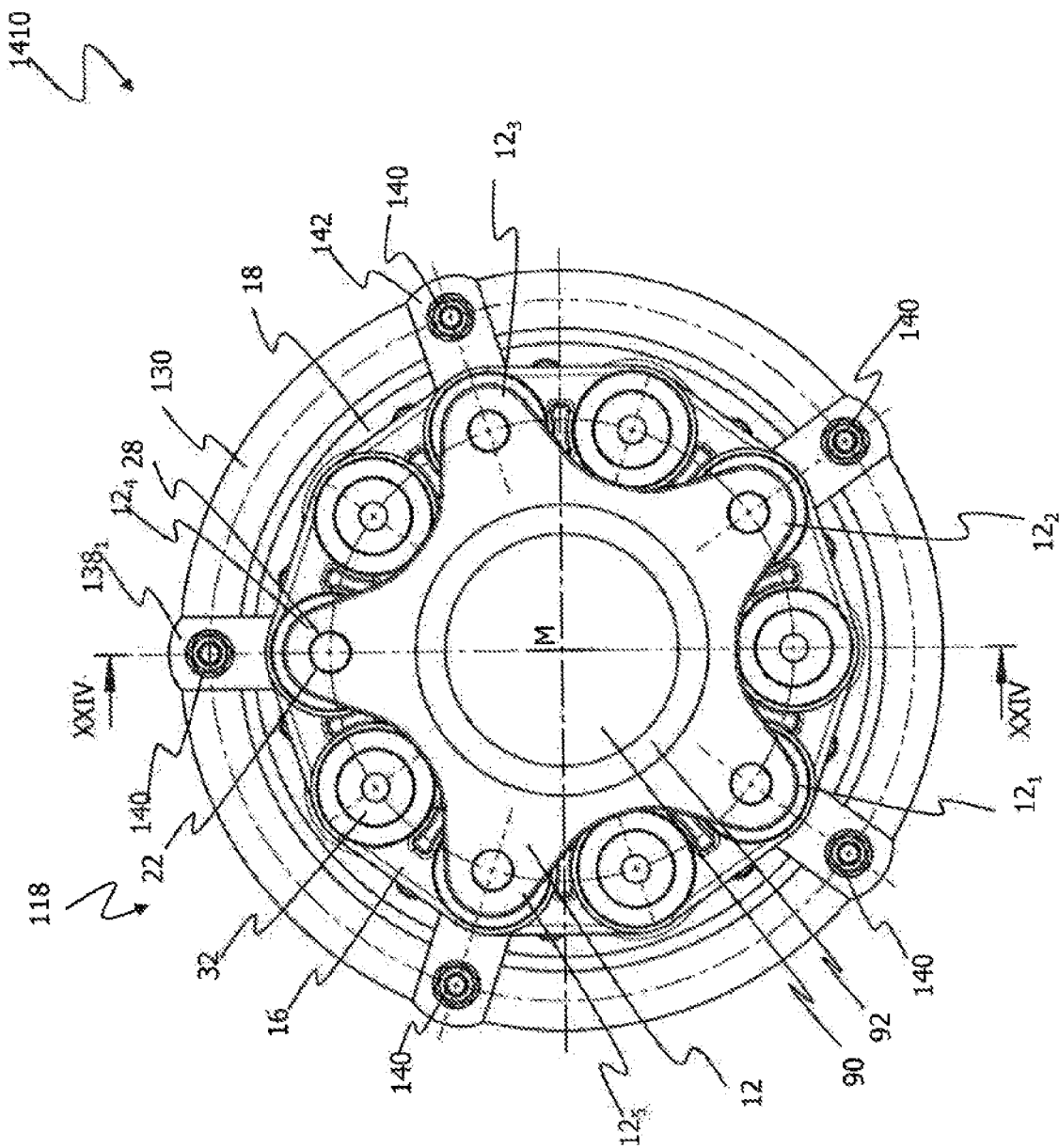
FIG. 23 shows a front view of a coupling device according to the sixth embodiment.

FIG. 23 shows a front view of the coupling device 1410.

The flange 12 with its five flange arms 12₁ to 12₅ can be seen in FIG. 23. The flange 12 is connected to the thread-reinforced joint mechanism 16. The centering device 118 extends radially to the outside around the connection assembly 18, as can be seen in FIG. 23 through the annular element 130. The joint diaphragm 138₁ extends radially outward from an area near the center axis M of the coupling device 1410 to the points of connection with the screws 140. The joint diaphragm 138₁ has four arms or bars 142, each of which is connected by means of a screw 140 to the other elements of the centering device 118.

Figure 24:
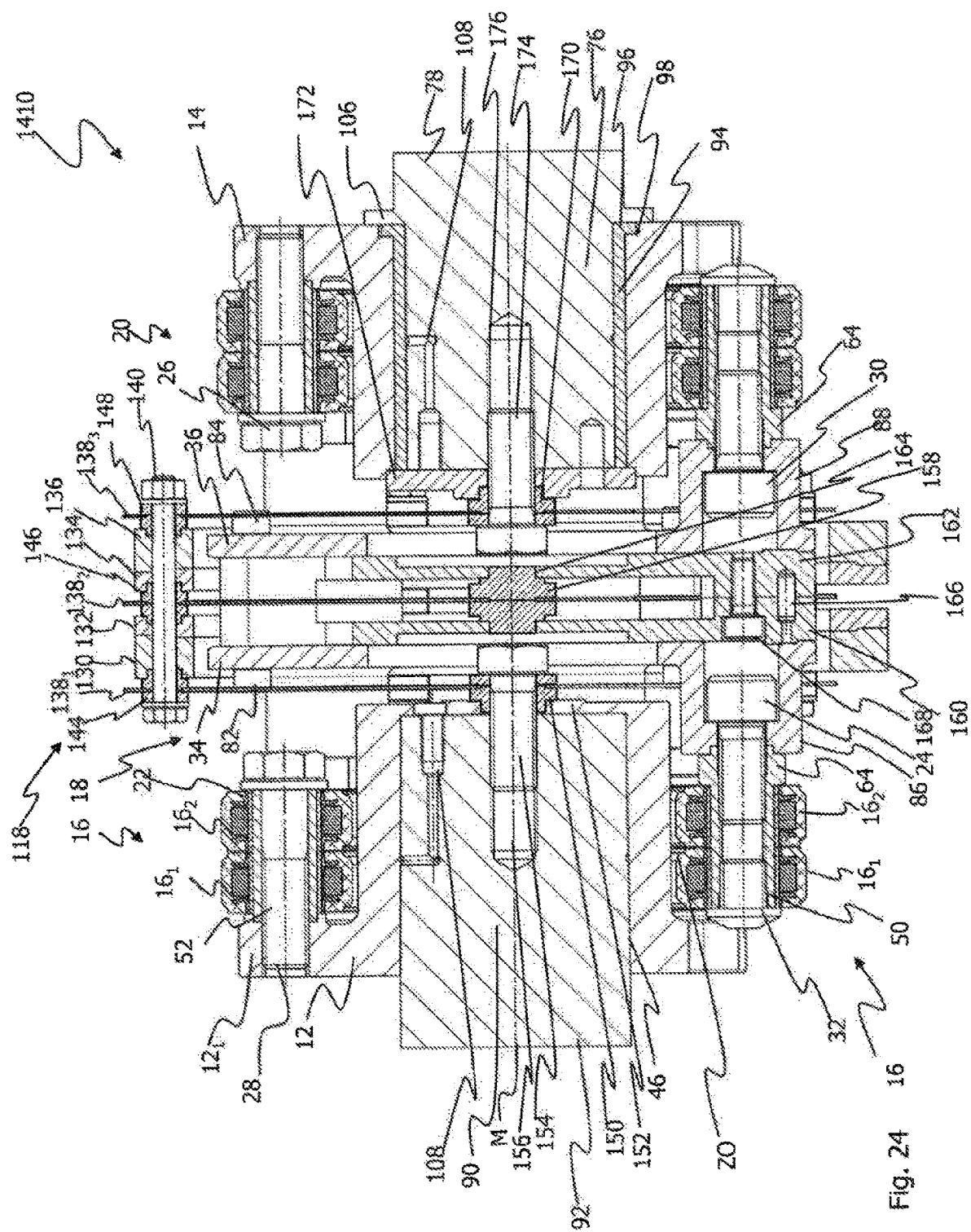
FIG. 24 shows a sectional view of a coupling device according to the sixth embodiment.

FIG. 24 shows a sectional view along the sectional line XXIV in FIG. 23.

FIG. 24 shows the centering device 118 that extends with its annular elements 130, 132, 134 and 136 radially on the outside around the connection device 18. The annular elements 130, 132 and 134, 136 rest against one another in pairs. The annular elements 130, 132, 134, 136 are coupled by means of coupling elements 144, 146, 148 with the joint diaphragms 138₁, 138₂ and 138₃. For this purpose, the coupling elements 144, 146, 148 and the annular elements 130, 132, 134 and 136 each have projections and recesses that engage in one another in the axial direction. The recesses and projections are visible in FIG. 24 in the upper area of the parts 130, 132, 134, 136 but have not been provided with reference symbols for the sake of clarity.

The coupling elements 144, 146 and 148 are provided at the ends of the arms 142 of the diaphragms 138₁, 138₂ and 138₃. The coupling elements 144, 146, 148 and the diaphragms 138₁, 138₂ and 138₃ associated therewith as well as the annular elements 130, 132, 134 and 136 are connected to one another by means of screws 140. The screws 140 extend through all of the elements named and can be secured on one side with a nut. It is also conceivable, however, to use two screws for connecting the abovementioned elements.

The joint diaphragms 138₁, 138₂, 138₃ extend radially inward. The diaphragm 138₁ is coupled by means of another coupling element 150 with a portion of the flange 12 extending in the axial direction. The axial portion 152 of the flange seals the opening 46 in the flange 12. The flange 12 thus has a cup-shaped form and can receive the connecting piece 90. The axial portion 152 of the flange also serves as a stop during the pressing of the flange 12 onto the connecting piece 90. The diaphragm 138₁ is coupled by means of the coupling element 150 and a screw 154 with the connecting piece 90. For this purpose, a threaded opening 156 is embodied in the connecting piece 90.

The centering device 118 is also coupled via the diaphragm 138₂ and the coupling element 158 with the connection assembly 18. Besides the two axially outside parts 34 and 26, the connection assembly 118 has two axially inside parts 160 and 16₂. The parts 160, 162 each have an opening 164 for receiving a projection on the coupling element 158. The two parts 160 and 162 are positioned in relation to one another by means of a positioning pin 166 and connected to one another by means of the screw 168. Together with the diaphragm 138₂, the two parts 160 and 162 form an assembly that can be introduced radially in the radial direction between the two other parts 34 and 36 of the connection assembly 18.

In addition, the centering device 118 is coupled via the diaphragm 138₃ and the coupling element 170 with the securing member 172. The coupling element 170 and the securing member 172 are screwed by means of a screw 174 to the connecting piece 76. For this purpose, the connecting piece 76 has a threaded opening 176. The securing member 172 is used to secure the flange 14 on the connecting piece 76. A bushing 94 is provided in the radial direction between the flange 14 and the connecting piece 76. The bushing 84 can act as a slip clutch. In the event that the flange 14 detaches from the outer peripheral surface of the bushing 94 in case of an overload, the securing member 172 and the projection 106 on the connecting piece 76 extending in the radial direction holds the flange 14 on the connecting piece 76.

The coupling device 1410 can be assembled as follows:

The first thread-reinforced joint mechanism 16 is screwed by means of the screws 22 to the flange 12. The first part 34 of the connection assembly 18 is screwed by means of the screws 24 to the fiber-reinforced joint mechanism 16. In like manner, the thread-reinforced joint mechanism 20 is screwed to the first flange 14 by means of the screws 26. The second part 36 of the connection assembly 18 is then inserted radially and screwed by means of the screws 30 to the fiber-reinforced joint mechanism 20.

The joint diaphragm 138₁ is arranged together with its coupling elements 144 and the annular element 130 associated therewith are arranged on the connecting piece 90 and the flange 12 and screwed to the connecting piece 90. The joint diaphragm 138₃ is then inserted radially with the annular element 136 associated therewith and screwed to the connecting piece 76 by means of the screw 174.

As mentioned previously, the two axially inside parts 160 and 162 of the connection assembly 18, the joint diaphragm 138₂, and the annular elements 132 and 134 associated therewith, form an assembly. This assembly is preassembled, with the parts 160, 162 being positioned on one another by means of the positioning pin 166 and interconnected by the screws 168. The annular elements 132 and 134 can also be connected in advance to the diaphragm 138₂. This assembly can now be used in the radial direction. Projections and recesses engaging in one another in the axial direction for positioning the parts 160, 162 on the parts 34 and 36 are provided on the parts 34 and 36 and the parts 160, 162 of the connection assembly 18. Similarly, projections and recesses engaging in one another in the axial direction for positioning the annular elements 32, 34 on the annular elements 130 and 136 are provided on the annular elements 130, 132, 134 and 136. The recesses and projections are visible in FIG. 24 in the lower area of the parts 160, 162, 132, 134 but have not been provided with reference symbols for the sake of clarity. It is also conceivable for the diaphragm 138₁ to be connected to the coupling element 144 and the annular element 130 in advance. The same applies to the diaphragm 138₃, coupling element 148, and annular element 136.

Following the radial introduction of the assembly, the parts 34, 36, 160 and 162 of the connection assembly 18 are connected to one another using the screws 82 and 84. The parts of the centering device 18 lying radially outside the connection assembly 18 are connected to one another by the screw 140.

Figure 25:
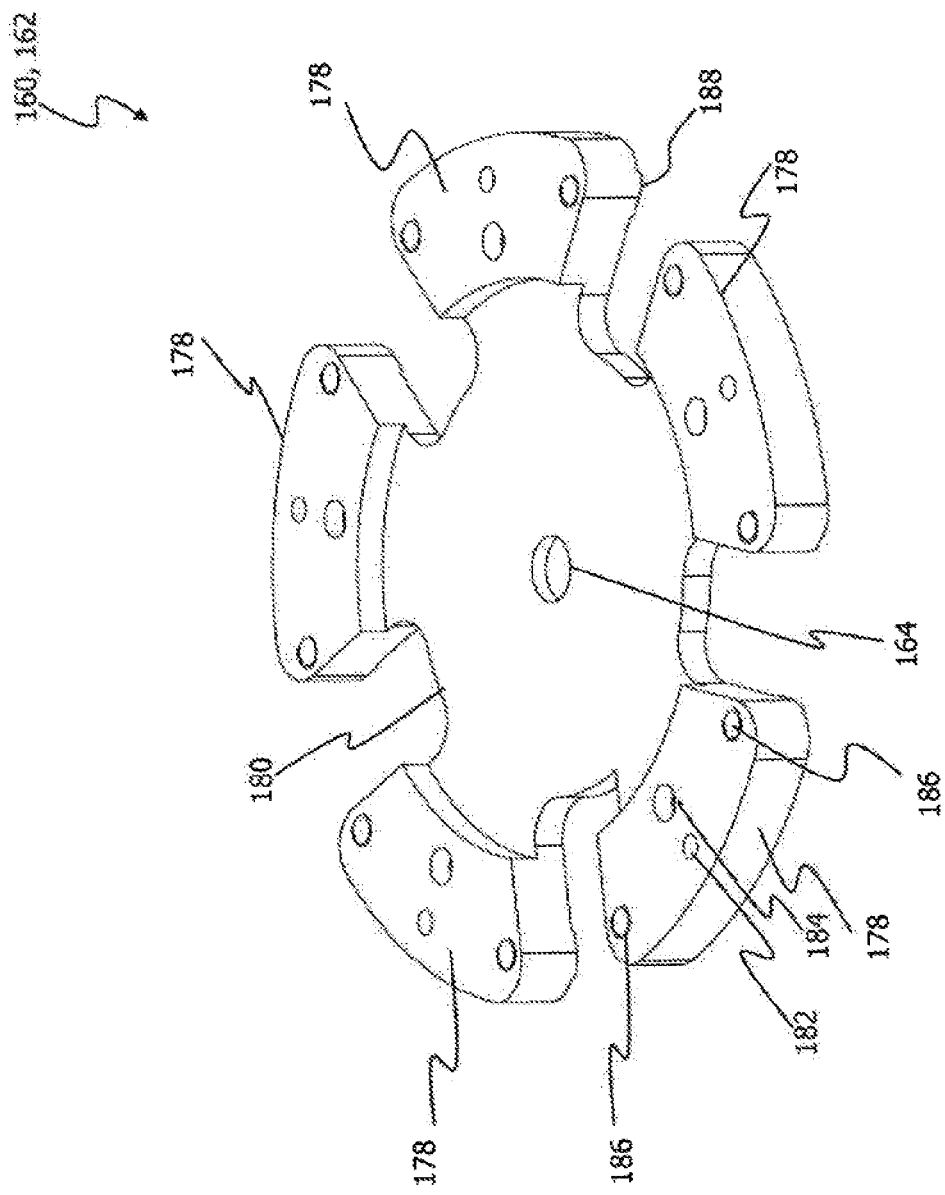
FIG. 25 shows a perspective view of parts of a connection assembly according to the sixth embodiment.

FIG. 25 shows a perspective exploded view of the parts 160, 162 of the connection assembly 18. The parts 160, 162 are substantially disc-shaped and have fastening projections 178. Recesses 180 through which the arms of the joint diaphragms extend in the assembled state can be seen between the projections 178. The fastening projections 176 each have an opening 182 for receiving a positioning pin 166 (FIG. 24). Moreover, an opening 184 is embodied in the fastening projections 178, which opening 184 serves to receive the connecting screw 168. The openings 182 and 184 lie on an imaginary radial line.

Each of the fastening projects 178 has additional 186 openings that serve to receive the screws 82 and 84 for connecting the individual parts of the connection assembly 18.

The element 160, 162 also has an opening 164 in its central area that serves to receive a projection of the coupling element 158 of the joint diaphragm 138₂. In FIG. 5, one cam also see the axial projections 188 that serve to position the parts 160, 162 on the other parts 34, 36 of the connection assembly 18 (see FIG. 24).

Figure 26:
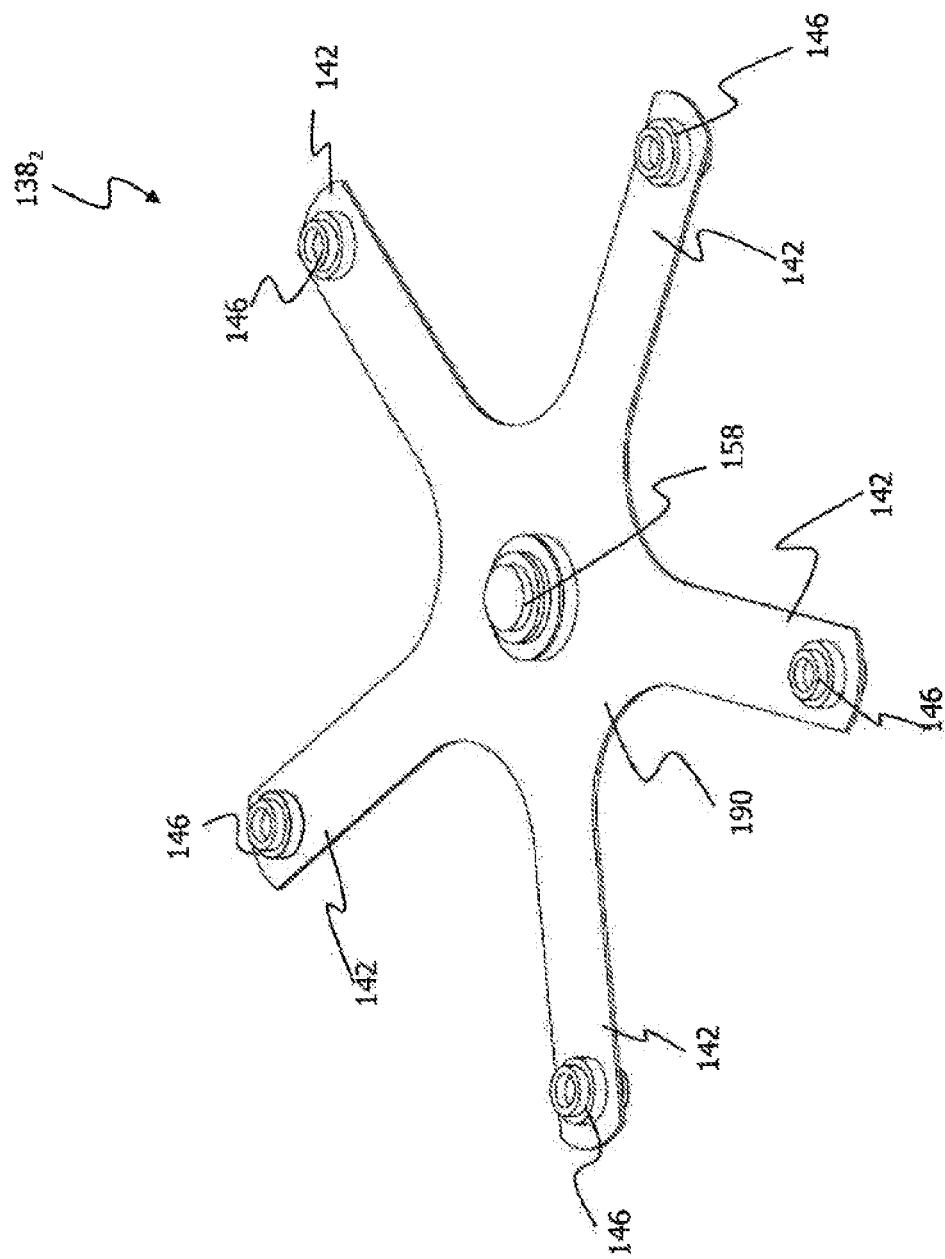
FIG. 26 shows a perspective view of a joint diaphragm according to the sixth embodiment.

FIG. 26 shows a perspective view of the joint diaphragm 138₂.

The joint diaphragm 138₂ has coupling element 146 for coupling with the annular elements 132 and 134 (see FIG. 24). The coupling elements 146 are provided on the arms 142. The arms 142 extend in a spoke-like manner from the central region 190 of the joint diaphragm 138₂. The central region 190 illustrates the coupling element 158, which is used for coupling with the parts 160, 162 connection assembly 18. The joint diaphragm 138₂ is rigid in the radial direction but also in the axial direction and also soft in terms of bending. By virtue of its radial stiffness, the joint diaphragm 138₂ can be used to radially support the connection assembly 18.

Figure 27:
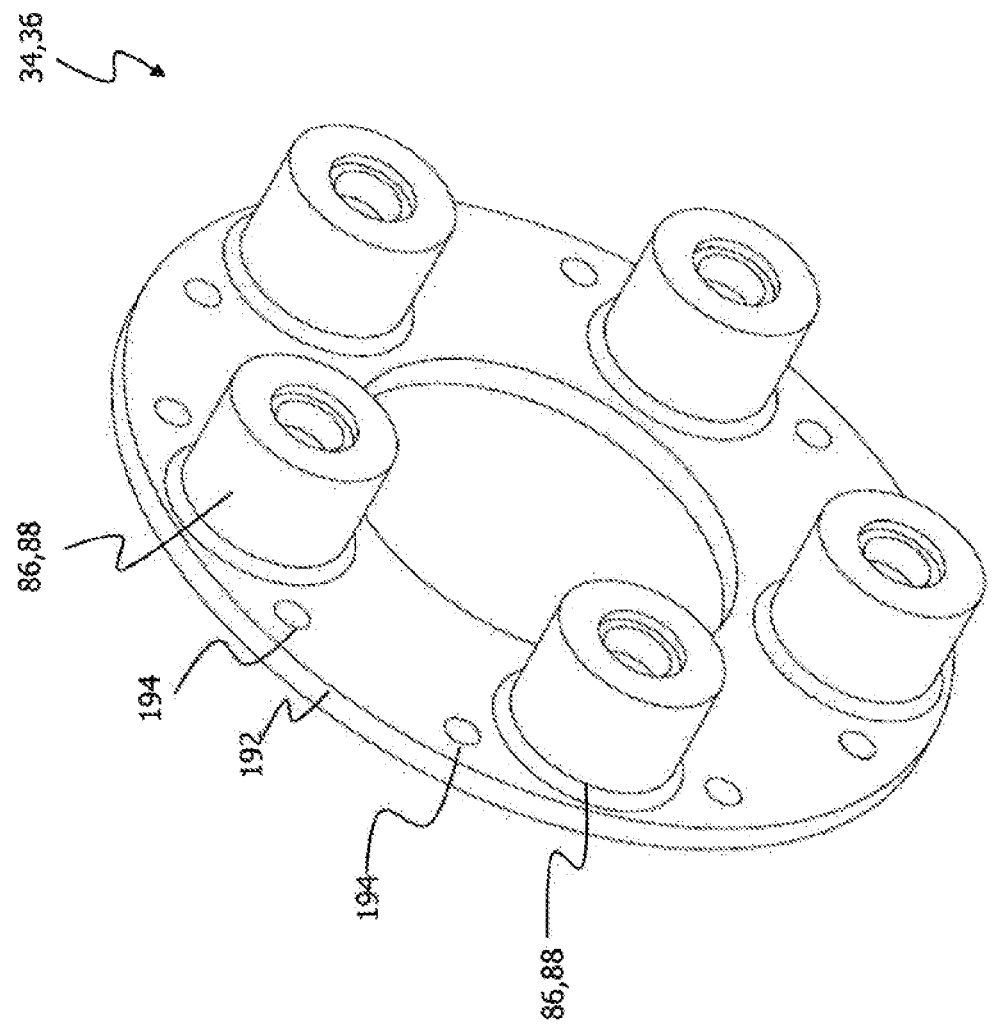
FIG. 27 shows a perspective view of further parts of a connection assembly according to the sixth embodiment.

FIG. 27 shows a perspective view of the parts 34, 36 of the connection assembly 18. The parts 34, 36 each have a palm rest 192. Starting from this disc-shaped base body 192, the projections 86, 88 extend in the axial direction away from the disc-shaped base body 192. In the circumferential direction between the projections 86 and 88, two openings 194, which are used for connecting the individual parts of the connection area 18 and thus for receiving the screws 82, 84.

Figure 28:
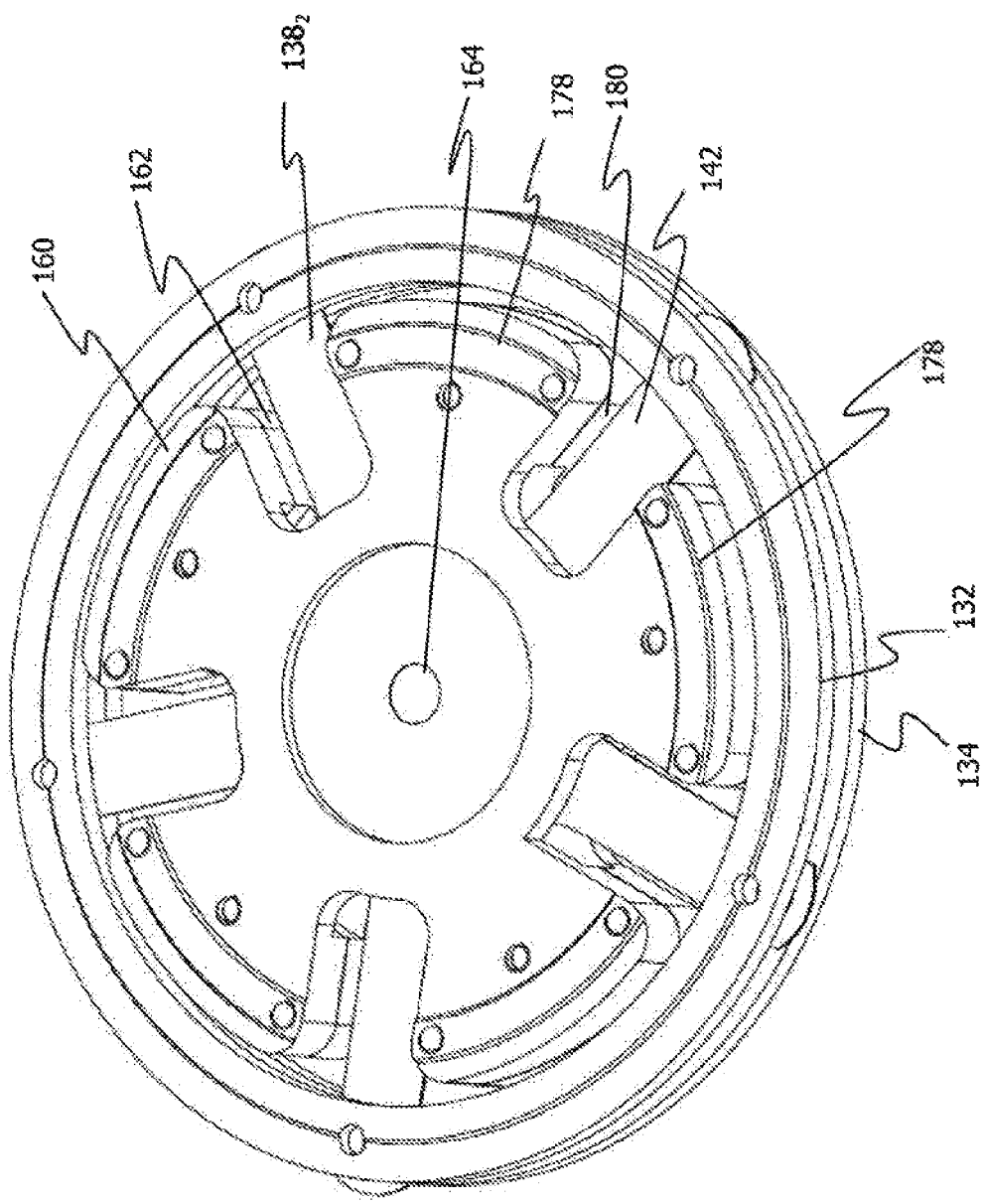
FIG. 28 shows a perspective view of assembly of the coupling device according to the sixth embodiment.

FIG. 28 shows a perspective view of the assembly of the coupling device 1410, which is central in the axial direction (see FIG. 24). FIG. 28 shows the parts 160, 162 of the connection assembly 118. The arms 142 of the joint diaphragm 138₂ protrude in the direction of the annular elements 134, 132 in the recesses 180 of the parts 160, 162 between the fastening projections 178. In other words, the joint diaphragm 138₂ connects the parts 160, 162 of the connection assembly 18 to the annular elements 132, 134 of the centering device 118.

Figure 29:
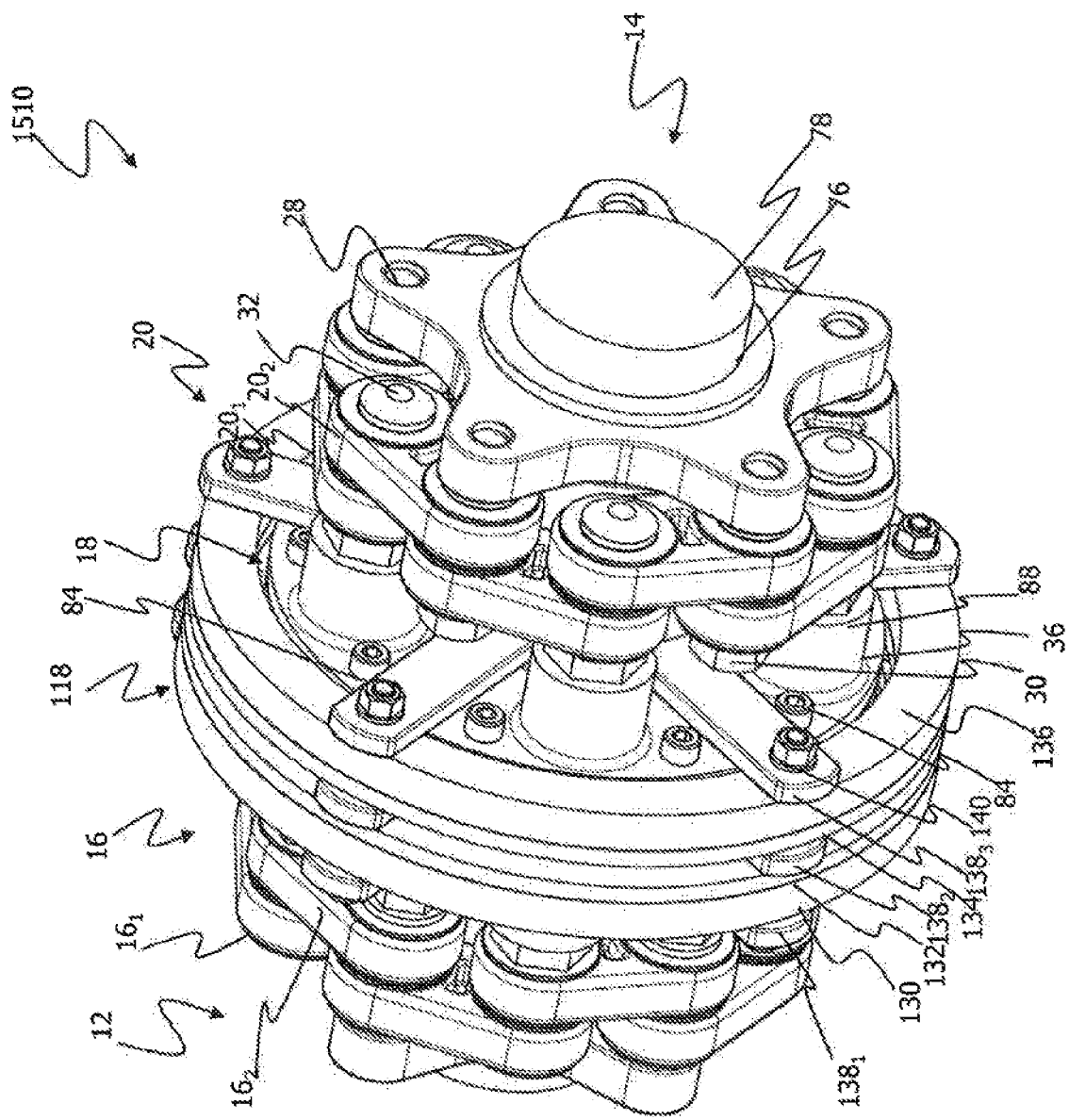
FIG. 29 shows a perspective view of a coupling device according to a seventh embodiment of the invention.
Figure 30:
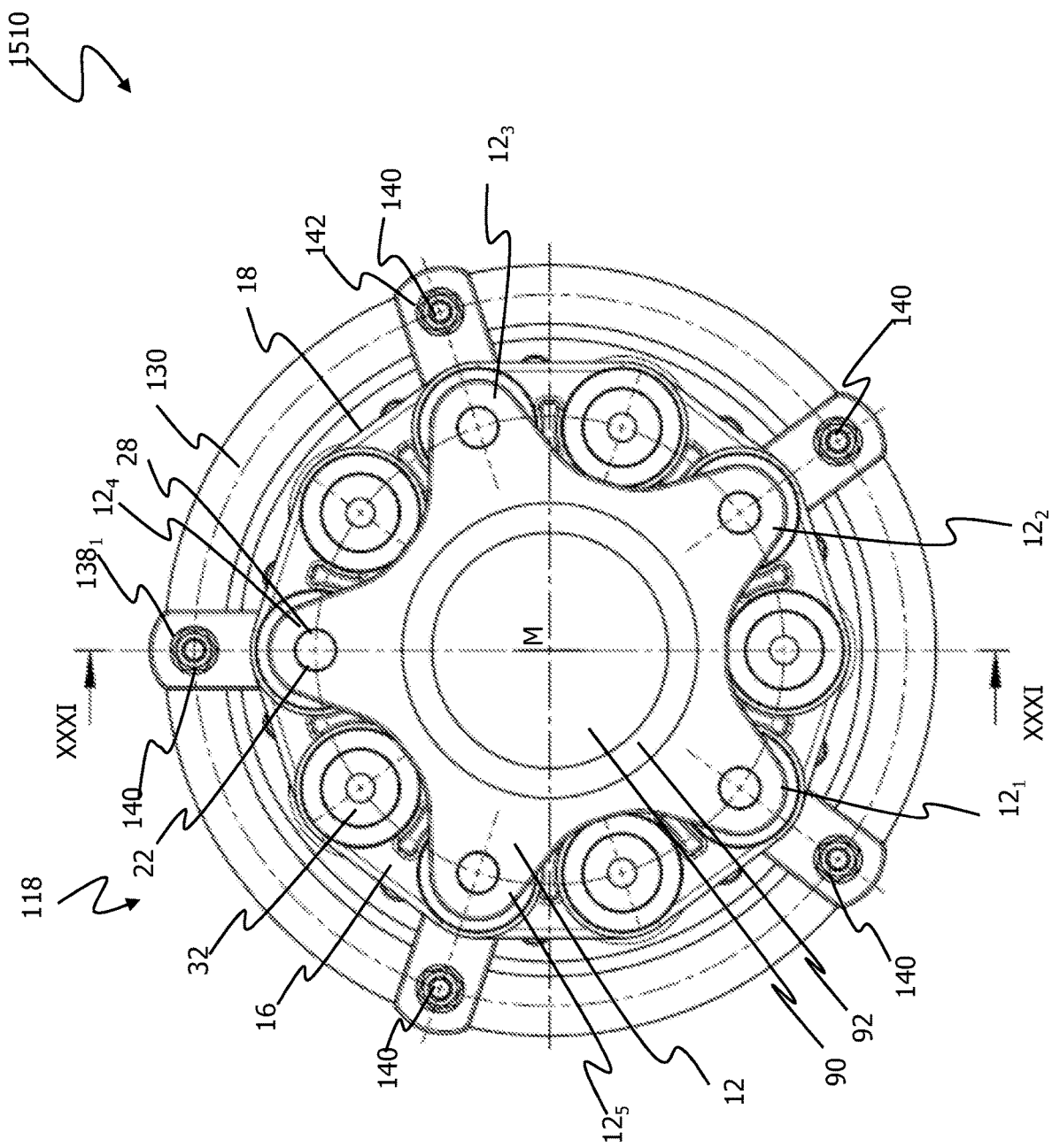
FIG. 30 shows a front view of a coupling device according to the seventh embodiment.
Figure 31:
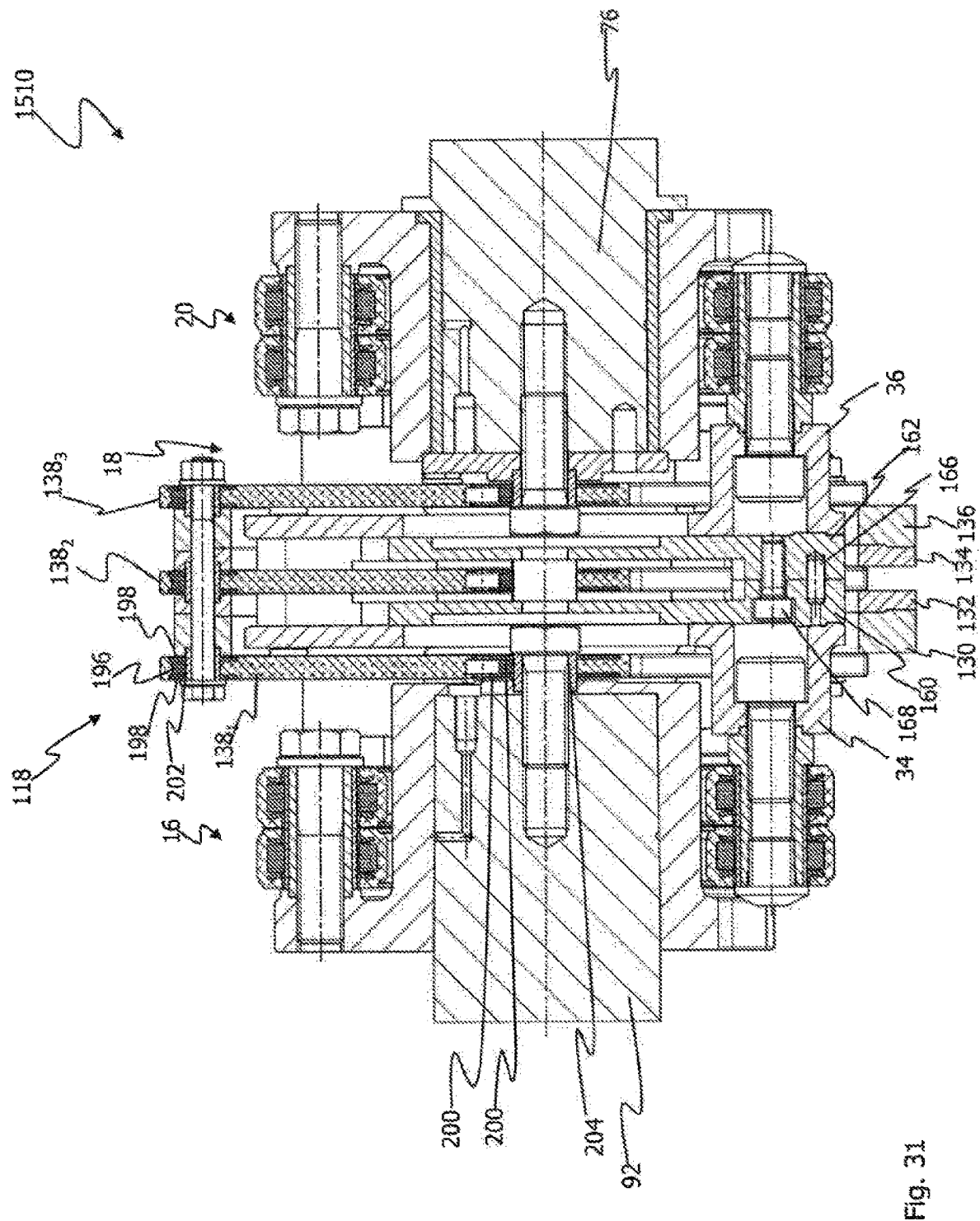
FIG. 31 shows a sectional view of a coupling device according to the seventh embodiment.

FIGS. 29 to 31 show a coupling device 1510 according to a seventh embodiment of the invention.

The only essential difference between the sixth embodiment described with reference to FIGS. 22 to 28 and the seventh embodiment shown in FIGS. 29 to 31 is that the joint diaphragms 138₁, 138₂ and 138₃ are not made of a metal sheet or the like as was the case in the sixth embodiment, but rather of an elastomer with thread structures and thread packages embedded therein. The thread packages 196 are secured in the axial direction using collar elements 198 and 200 to the respective bushings 202 and 204 and protected from force effects during assembly by screws, for example.

The centering devices 118 of the embodiments described in the foregoing support the connecting assembly 18 by means of the joint diaphragms 138₁, 138₂ and 138₃. For this purpose, the joint diaphragms 138₁, 138₂ and 138₃ are rigid in the radial direction. The gimbal length of the coupling device is defined by the distance between the thread-reinforced joint mechanisms 16 and 20. The joint diaphragms 138₁, 138₂, 138₃ are radially pretensioned. The joint diaphragms 138₁, 138₂, 138₃ are coupled with the annular elements 130, 132, 134 and 136. As a result, no pretensioning forces are required during the assembly of the coupling device 1510.

The centering device 118 is arranged with its joint diaphragms 138₁, 138₂ and 138₃ in the axial direction between the thread-reinforced joint mechanisms 16 and 18. In other words, the centering device 118 is arranged in a space that is bordered by the mutually facing axial sides of the thread-reinforced joint mechanisms 16, 18. The centering device 18 is arranged above the axial extension of the thread-reinforced joint mechanism 16 and 18.

According to the above embodiments, the centering device 118 with its joint assembly 24 has the following functionality:

When installed in a shaft assembly, the two thread-reinforced joint mechanisms 16, 20 can have a bending angle of 1°, for example, due to an offset existing in the radial direction between two shafts to be connected that is to be equalized by means of the coupling device.

Since the centering device 118 is arranged between the two thread-reinforced joint mechanisms 16 and 20, the centering device 118 has a lower gimbal length. The gimbal length of the centering device 118 is determined from the axial distance between the joint diaphragm 138₁ and joint diaphragm 138₃. The gimbal length of the coupling device 1410 is determined from the axial distance of the thread-reinforced joint mechanisms 16 and 20. In detail, this means that the distance in the axial direction between the two joint diaphragms 138₁ and 138₃ is less than the distance between the two thread-reinforced joint mechanisms 16 and 20. At a bending angle of 1° of the thread-reinforced joint mechanisms 16 and 20, the joint diaphragms 138₁ and 138₃ have a bending angle of 3°, for example, due to their low gimbal length.

Accordingly, the joint diaphragm 138₂ must equalize and compensate for an angular difference of 2°. Due to its resilience in the axial direction, the joint diaphragm 138₂ can compensate such an angle difference even in the event of flexural stresses. As a result, the radial supporting of the connection assembly 18 without slide bearings and sliding movements can be achieved. Moreover, the connecting pieces need not be changed in order to provide radial support.

The invention claimed is:

1. A coupling device for connecting a motor to a transmission of a vehicle, the coupling device comprising:
    at least one first flange;
    at least one second flange;
    at least one first thread-reinforced joint mechanism;
    at least one second thread-reinforced joint mechanism; and
    at least one connection assembly that is arranged between the first and the second thread-reinforced joint mechanism,
    wherein the at least one first thread-reinforced joint mechanism and the at least one second thread-reinforced joint mechanism define a connection area between them in a direction of a center axis of the coupling device, and wherein the first thread-reinforced joint mechanism is connected starting from the connection area to the at least one connection assembly, and the first flange and the second thread-reinforced joint mechanism is connected to the at least one connection assembly and the second flange, wherein the first and the second thread-reinforced joint mechanisms are connected by fastening means to the first and second flange and the at least one connection assembly, wherein the first thread-reinforced joint mechanism is connected starting from the connection area by the fastening means to the at least one connection assembly, and the first thread-reinforced joint mechanism is connected starting from the connection area by the fastening means to the first flange, and wherein the second thread-reinforced joint mechanism is connected starting from the connection area by the fastening means to the at least one connection assembly, and the second thread-reinforced joint mechanism is connected starting from the connection area by the fastening means to the second flange.

2. The coupling device as set forth in claim 1, wherein the connection area is bordered in the axial direction by at least one axial surface of the first thread-reinforced joint mechanism facing away from the first flange and at least one axial surface of the second thread-reinforced joint mechanism facing away from the second flange.

3. The coupling device as set forth in claim 1, wherein axial surfaces of the first thread-reinforced joint mechanism and of the second thread-reinforced joint mechanism defining the connection area are oppositely situated.

4. The coupling device as set forth in claim 1, wherein the at least one first and the at least one second thread-reinforced joint mechanism has at least one first coupling element that is associated with the at least one connection assembly and at least one second coupling element that is associated with the corresponding first or second flange.

5. The coupling device as set forth in claim 4, wherein fastening means for connecting to the first flange or the second flange extend through the at least one second coupling element.

6. The coupling device as set forth in claim 4, wherein the at least one first coupling element partially receives fastening means for connecting the at least one connection assembly to the first thread-reinforced joint mechanism or the second thread-reinforced joint mechanism.

7. The coupling device as set forth in claim 6, wherein the at least one connection assembly has at least one first part and at least one second part.

8. The coupling device as set forth in claim 7, wherein the first part and the second part of the at least one connection assembly are coupled with one another in a torque-transmitting manner by means of corresponding teeth.

9. The coupling device as set forth in claim 7, wherein the at least one connection assembly has at least one intermediate member that is arranged in the axial direction between the first part and the second part.

10. The coupling device as set forth in claim 9, wherein the at least one intermediate member is detachably connected to the first and the second part such that it can be removed from the coupling device in the radial direction.

11. The coupling device as set forth in claim 9, wherein the first part and the second part are screwed to the at least one intermediate member with screws each extending from the direction of the first and the second thread-reinforced joint mechanism into the at least one intermediate member.

12. The coupling device as set forth in claim 9, wherein the at least one intermediate member is annular.

13. The coupling device as set forth in claim 9, wherein the at least one connection assembly comprises pairs of projections and recesses that serve to position individual parts of the at least one connection assembly in relation to one another.

14. The coupling device as set forth in claim 13, wherein the positioning means are formed by corresponding projections and recesses on the first part the second part and the center part.

15. The coupling device as set forth in claim 7, wherein the at least one first part and the at least one second part have at least one projection that is provided with at least one opening for fastening means.

16. The coupling device as set forth in claim 15, wherein the at least one opening is stepped and received by at least one fastening means.

17. The coupling device as set forth in claim 1, wherein at least one centering device is arranged for radially supporting the at least one connection assembly with the at least one centering device having at least one joint assembly that is arranged in the axial direction between the first thread-reinforced joint mechanism and the second thread-reinforced joint mechanism.

18. The coupling device as set forth in claim 17, wherein the at least one joint assembly is respectively spaced a specified distance in the axial direction from the first thread-reinforced joint mechanism and the second thread-reinforced joint mechanism.

19. The coupling device as set forth in claim 17, wherein the at least one joint assembly is arranged between mutually facing axial end surfaces of the first flange and the second flange.

20. The coupling device as set forth in claim 17, wherein the at least one joint assembly is arranged between mutually facing axial end surfaces of the first thread-reinforced joint mechanism and the second thread-reinforced joint mechanism.

21. The coupling device as set forth in claim 17, wherein at least one first coupling element is associated with the first flange and at least one second coupling element is associated with the second flange, wherein the at least one second coupling element couples the first flange and the second flange with the at least one joint assembly.

22. The coupling device as set forth in claim 17, wherein the at least one joint assembly has at least one first joint diaphragm and at least one second joint diaphragm.

23. The coupling device as set forth in claim 22, wherein the distance between the at least one first joint diaphragm and the at least one second joint diaphragm in the axial direction is less than the distance between the first thread-reinforced joint mechanism and the second thread-reinforced joint mechanism.

24. The coupling device as set forth in claim 22, wherein the at least one joint assembly has at least one third joint diaphragm.

25. The coupling device as set forth in claim 24, wherein the at least one third joint diaphragm is arranged in the axial direction between the at least one first joint diaphragm and the at least one second joint diaphragm.

26. The coupling device as set forth in claim 24, wherein the at least one third joint diaphragm is connected to the at least one connection assembly in order to support it radially.

27. The coupling device as set forth in claim 24, wherein the joint diaphragms of the at least one joint assembly extend in the radial direction.

28. The coupling device as set forth in claim 24, wherein the joint diaphragms of the at least one joint assembly are connected to one another in the radial direction outside of the at least one connection assembly.

29. The coupling device as set forth in claim 24, wherein the at least one first joint diaphragm is associated with the first flange and the at least one second joint diaphragm is associated with the second flange.

30. A drive arrangement for a railway vehicle with a motor and a transmission, wherein a motor output shaft and a transmission input shaft is connected by means of at least one coupling device as set forth in claim 1.

31. The drive arrangement as set forth in claim 30, wherein the motor output shaft and the transmission input shaft has at least one connecting piece for connecting to the at least one coupling device.

32. The drive arrangement as set forth in claim 31, wherein the at least one connecting piece is received in an opening of the first flange and/or second flange.

33. The drive arrangement as set forth in claim 31, wherein at least one bushing is arranged between the first flange and the at least one connecting piece that establishes a connection between the at least one connecting piece and the first flange and/or the second flange.

34. The drive arrangement as set forth in claim 31, wherein at least one securing means is provided which holds the first or the second flange on the at least one connecting piece.

35. The drive arrangement as set forth in claim 31, wherein the at least one connecting piece has at least one projection extending in the radial direction.

36. The drive arrangement as set forth in claim 31, wherein at least one centering sleeve is received on the at least one connecting piece that cooperates with at least one centering bolt on the at least one connection assembly.

37. The drive arrangement as set forth in claim 31, wherein the at least one connecting piece has at least one borehole that serves to apply a specified oil pressure.

38. The drive arrangement as set forth in claim 31, wherein the at least one joint assembly is connected to the at least one connecting piece.

* * * * *